(12) United States Patent
Kitagawa et al.

(10) Patent No.: US 10,788,697 B2
(45) Date of Patent: Sep. 29, 2020

(54) DISPLAY APPARATUS AND METHOD OF MANUFACTURING THE SAME

(71) Applicant: TIANMA JAPAN, LTD., Kawasaki, Kanagawa (JP)

(72) Inventors: Yoshiro Kitagawa, Kawasaki (JP); Hitoshi Yoshida, Kawasaki (JP); Akira Fujita, Kawasaki (JP)

(73) Assignee: TIANMA MICROELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 15/687,896

(22) Filed: Aug. 28, 2017

(65) Prior Publication Data
US 2018/0059462 A1 Mar. 1, 2018

(30) Foreign Application Priority Data

Aug. 31, 2016 (JP) ................................ 2016-169653

(51) Int. Cl.
*G02F 1/1333* (2006.01)

(52) U.S. Cl.
CPC .... *G02F 1/13338* (2013.01); *G02F 1/133308* (2013.01); *G02F 2202/28* (2013.01)

(58) Field of Classification Search
CPC .......... G02F 1/13338; G02F 1/133308; G02F 2202/28; G02F 1/1333; G06F 3/0412
See application file for complete search history.

(56) References Cited

U.S. PATENT DOCUMENTS

| 6,291,036 | B1 * | 9/2001 | Wang | C03B 27/00 428/34 |
|---|---|---|---|---|
| 6,444,281 | B1 * | 9/2002 | Wang | E06B 3/6612 428/34 |
| 8,319,355 | B2 * | 11/2012 | Shih | C09D 163/00 257/100 |
| 9,169,687 | B2 * | 10/2015 | Schreiber | E04B 1/803 |
| 9,458,052 | B2 * | 10/2016 | Dennis | C03C 8/04 |
| 9,566,774 | B2 * | 2/2017 | Osako | H01L 51/524 |
| 9,947,891 | B2 * | 4/2018 | Qian | H01L 51/56 |
| 2002/0130990 | A1 | 9/2002 | Nakamura | |
| 2002/0191287 | A1 * | 12/2002 | Miyazawa | G02B 5/3025 359/485.01 |
| 2003/0117708 | A1 * | 6/2003 | Kane | G02B 5/3058 359/513 |

(Continued)

FOREIGN PATENT DOCUMENTS

| JP | 55-181278 U | 12/1980 |
|---|---|---|
| JP | 07-28409 A | 1/1995 |

(Continued)

OTHER PUBLICATIONS

Communication dated Aug. 4, 2020, in Japanese Application No. 2016-169653, 8 pages in English and Japanese.

*Primary Examiner* — Abhishek M Rathod
(74) *Attorney, Agent, or Firm* — Sughrue Mion, PLLC

(57) ABSTRACT

A display apparatus comprises a display device, a functional substrate opposed to and bonded to the display device through an air space and, at peripheral borders on the opposite surfaces of the display device and the functional substrate, first resin maintaining the distance between the display device and the functional substrate and second resin adhering the display device and the functional substrate to each other.

6 Claims, 46 Drawing Sheets

(56) References Cited

U.S. PATENT DOCUMENTS

| | | | | |
|---|---|---|---|---|
| 2003/0214623 | A1* | 11/2003 | Ebisu | G02F 1/13394 349/156 |
| 2007/0158021 | A1* | 7/2007 | Sawai | H01J 5/20 156/285 |
| 2007/0194304 | A1* | 8/2007 | Zu | H01L 51/5246 257/40 |
| 2010/0149452 | A1* | 6/2010 | Harada | G02F 1/1333 349/58 |
| 2012/0326131 | A1* | 12/2012 | Han | H01L 51/5215 257/40 |
| 2013/0293072 | A1* | 11/2013 | Sturniolo | H05K 5/0004 312/138.1 |
| 2014/0293430 | A1* | 10/2014 | Takahashi | G03B 21/005 359/630 |
| 2015/0355498 | A1* | 12/2015 | Yoshida | G02F 1/133308 349/110 |

FOREIGN PATENT DOCUMENTS

| | | | |
|---|---|---|---|
| JP | 2000195675 | A | 7/2000 |
| JP | 2000206894 | A | 7/2000 |
| JP | 2004-117646 | A | 4/2004 |
| JP | 2005055641 | A | 3/2005 |
| JP | 2010080345 | A | 4/2010 |
| JP | 2012185457 | A | 9/2012 |

* cited by examiner

F I G. 2 2 A
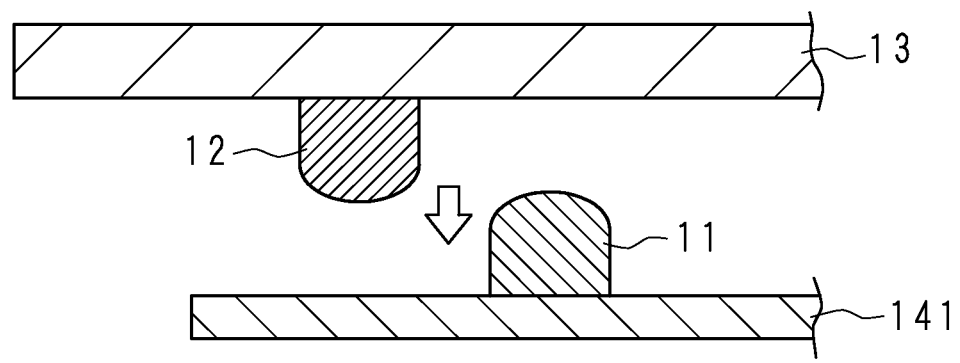
F I G. 2 2 B
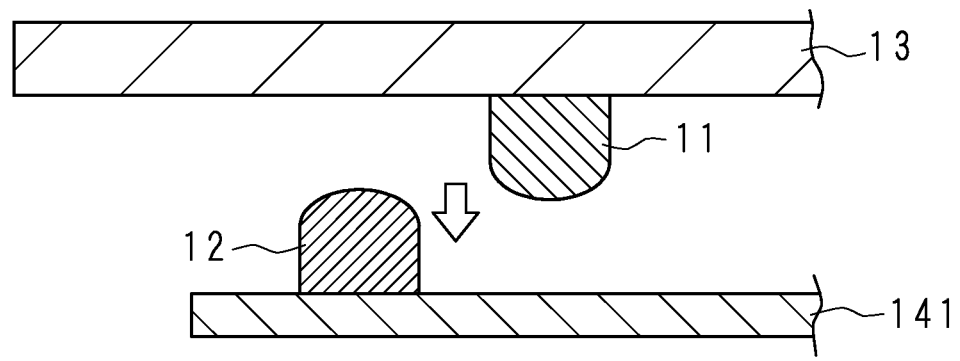

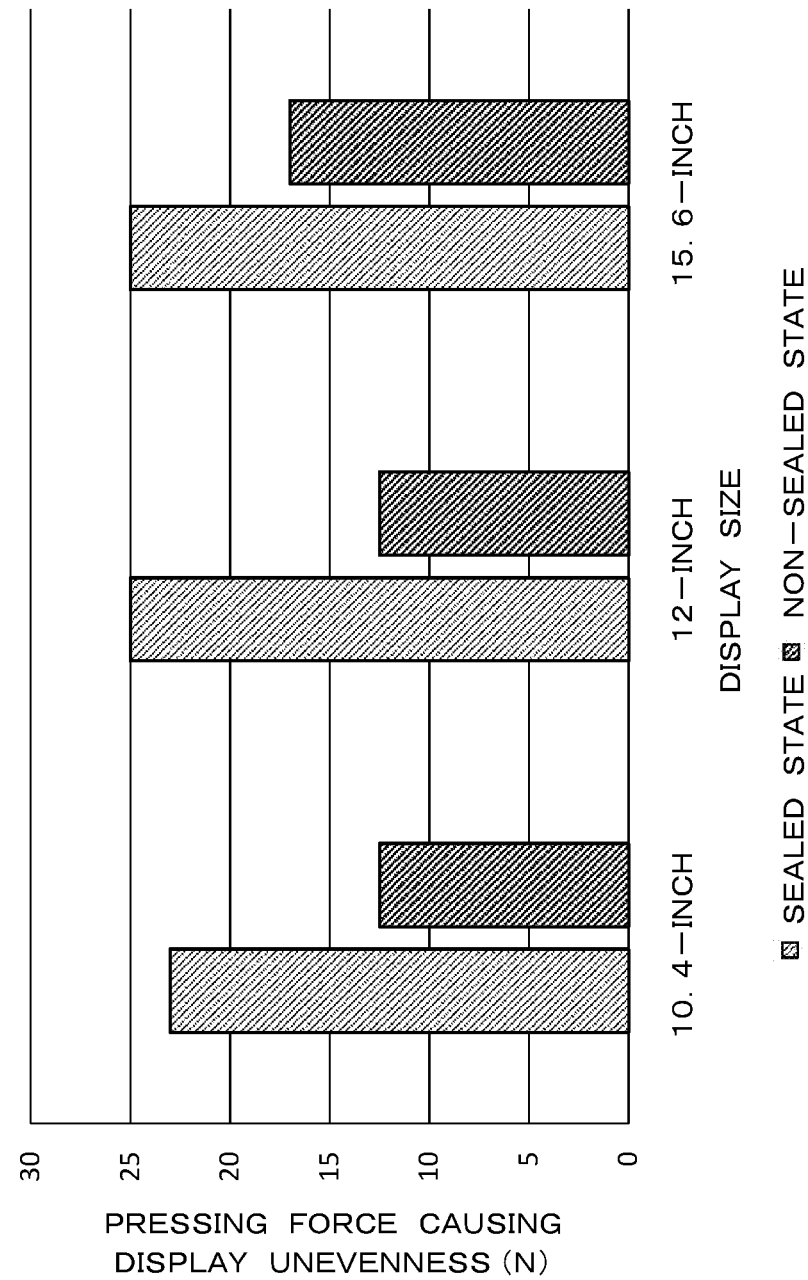

DISPLAY APPARATUS AND METHOD OF MANUFACTURING THE SAME

CROSS-REFERENCE TO RELATED APPLICATIONS

This non-provisional application claims priority under 35 U.S.C. § 119(a) on Patent Application No. 2016-169653 filed in Japan on Aug. 31, 2016, the entire contents of which are hereby incorporated by reference.

FIELD

The present disclosure relates to a display apparatus and a method of manufacturing the same.

BACKGROUND

In recent years, display apparatuses provided with a functional substrate such as a touch panel, a decorative panel and the like have been widespread. A touch panel is an input interface component. A decorative panel is, for example, a reinforcement glass printed for decoration, from the viewpoint of design, display surface protection and so forth.

Typically, in the case where the display apparatus is provided with the functional substrate, it is so configured that an air space is interposed between the display panel and the functional substrate so that a gap is provided between the display panel and the functional substrate. More specifically, in the case where the peripheral border of the display panel is bonded to the peripheral border of the functional substrate for example, the display panel and the functional substrate are bonded together with a space provided in between so that the display surface of the display panel is not in contact with the functional substrate. In the description below, such bonding of the display panel or the like and the functional substrate with the air space interposed between them is called "air gap bonding," while the structure of the display apparatus in which the display panel or the like and the functional substrate are bonded together with the air space interposed between them is called an "air gap bonding structure."

In the case where, for example, the functional substrate is a touch panel, the air gap bonding structure may be employed to avoid a display failure caused by the touch panel making contact with the display panel, even if the touch panel is warped toward the display panel as a result of pressing action by the user. In the description below, the display failure caused by such contact is referred to as "display unevenness."

Japanese Patent Application Laid-Open No. 2004-117646 discloses a display apparatus having an air gap bonding structure, in which a display panel or the like and a functional substrate are bonded together with a thick double-sided tape so as to have an air space while separating the display panel from the functional substrate by a predetermined distance. In the case of using a double-sided tape, however, the following problems remain.

First, the bonding work using the double-sided tape is carried out manually in large part, since it is difficult to automate such work by a machine. Moreover, different products of double-sided tapes have different shapes, which requires the double-sided tape to be molded into a desired shape with the use of a dedicated punching die. In the case of bonding with the double-sided tape, therefore, problems arise in the productivity, manufacturing cost and so forth.

Second, the double-sided tape is generally configured with foam material such as acrylic foam having a certain thickness that is held between adhesive layers in order to secure a desired distance between the display panel and the functional substrate. However, foam material such as acrylic foam is softer than non-foam material such as synthetic resin, and therefore easily causes bulk destruction. Thus, the double-sided tape tends to have lowered adhesion strength per unit area because of the bulk destruction.

Third, in the case where the size of the display apparatus is increased, a wide double-sided tape is necessary, making it difficult to attain a slim border display.

In order to solve the problems described above, it is conceivable to employ an adhesive made of resin in place of a double-sided tape. In particular, the adhesive made of resin is inexpensive, and also has the advantage of facilitating an automated bonding work. In the case where the adhesive made of resin is applied to the air gap bonding structure, however, the following problems arise.

First, the adhesive made of resin has low resistance to weight. Accordingly, it is difficult for the adhesive made of resin to maintain the distance between the functional substrate and the display panel.

Second, in the case where the viscosity of the adhesive is made higher in order to improve the resistance to weight, the discharging performance of a dispensing device, which is to be used for example to apply the adhesive, is significantly lowered. Moreover, in the case where spacer material is mixed into the adhesive in order to keep the space between the functional substrate and the display panel after bonding, the nozzle of the dispensing device is easily clogged. Thus, the countermeasures as described above would deteriorate the productivity.

It is therefore difficult to maintain the distance between the display panel and the functional substrate if the adhesive made of resin is used as it is in place of a double-sided tape.

Japanese Patent Application Laid-Open No. H07-28409 discloses an air gap bonding structure in which a protective plate is bonded to a liquid crystal panel by a spacer made of elastic resin and adhesive resin. The spacer includes elastic resin having the shape of a long and thin quadrangular prism and adhesive resin located on three side surfaces of the elastic resin. The protective plate and the liquid crystal panel are bonded together by being adhered to one side surface of elastic resin and to the opposite side surface of the one side surface, respectively. Thus, the distance between the protective plate and the liquid crystal panel is maintained by the elastic resin.

To bond the protective plate to the liquid crystal panel by the spacer described above, however, it is necessary to carry out complicated steps of applying adhesive resin to the side surfaces of elastic resin and then adhering the protective plate and the liquid crystal panel to the side surfaces of the elastic resin. Therefore, the invention according to Japanese Patent Application Laid-Open No. H07-28409 cannot serve to solve the problems of productivity and so forth.

SUMMARY

According to one aspect, a display apparatus comprises: a display device; a functional substrate opposed to and bonded to the display device through an air space; and at peripheral borders of opposed surfaces of the display device and the functional substrate, first resin for maintaining a distance between the display device and the functional substrate, and second resin adhering the display device and the functional substrate to each other.

According to one aspect, a method of manufacturing a display apparatus comprises steps of: forming, at a peripheral border of an opposed surface of a display device or a functional substrate to be opposed to and bonded to the display device, first resin for maintaining a distance between the display device and the functional substrate; applying second resin for adhering the display device and the functional substrate to each other at the peripheral border after forming the first resin; and bonding the display device and the functional substrate together through an air space.

It is to be understood that both the foregoing general description and the following detailed description are exemplary and explanatory and are not restrictive of this disclosure.

BRIEF DESCRIPTION OF DRAWINGS

FIGS. 22A and 22B illustrate another example of the method of manufacturing the display apparatus according to Embodiment 2;

FIG. 46 is a graph illustrating a comparison example where comparison is made on the air gap bonding structure for the differences in the pressure in air spaces.

DETAILED DESCRIPTION

Figure 1:
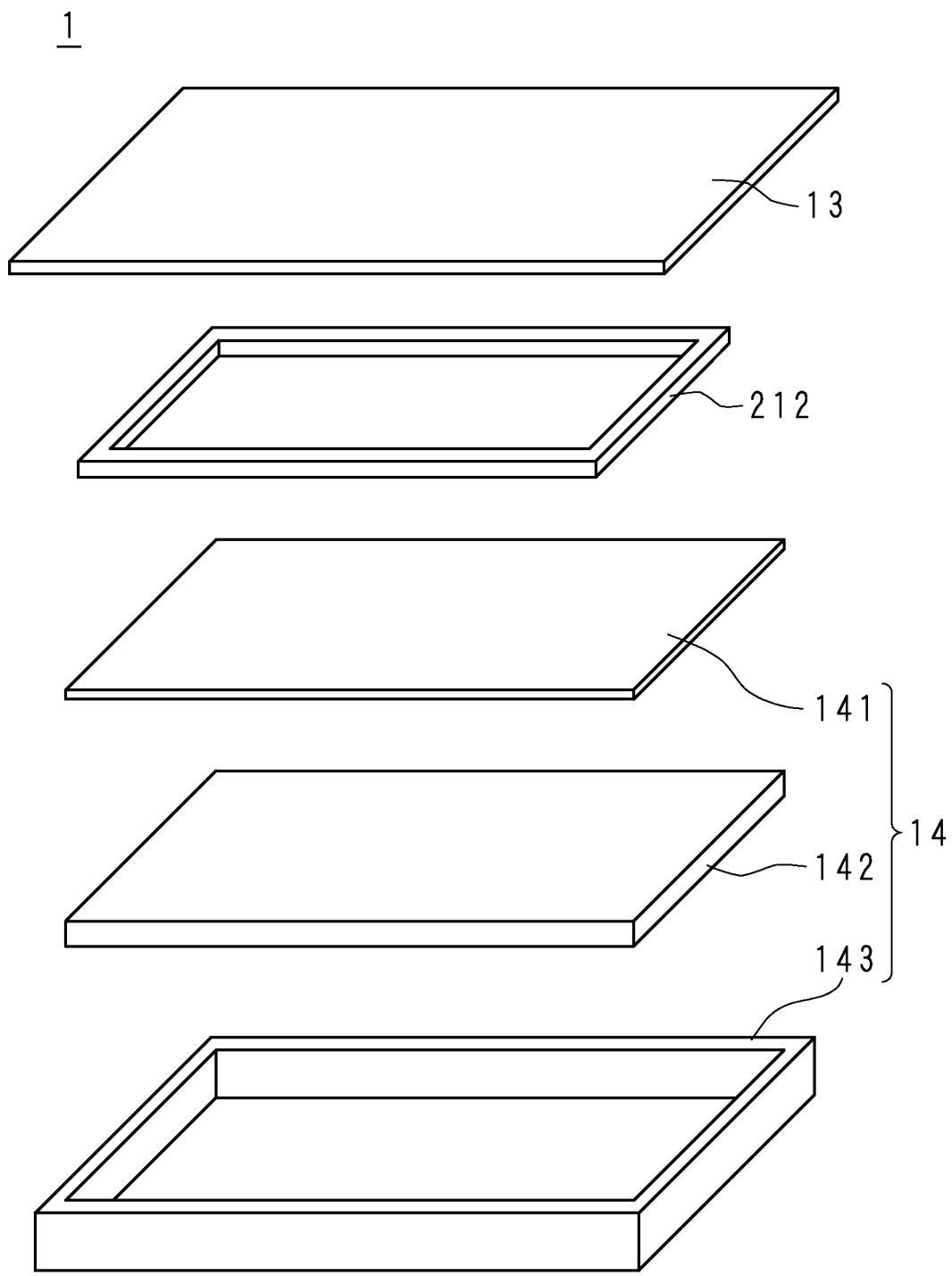
FIG. 1 is an exploded perspective view illustrating a configuration example of a display apparatus according to the related art.

The present disclosure will be described below in detail with reference to the drawings illustrating the embodiments thereof. In the present specification and drawings, same components are denoted by the same reference codes. The figuration in the drawings is not necessarily consistent with the actual dimensions and proportions. The section views do not illustrate the structures in the depth direction but only illustrate cut surfaces. The language "comprise" in the present specification and claims may also encompass elements other than the ones explicitly described. Same applies to the language "have," "include" and so forth.

Before describing a display apparatus according to an embodiment, a display apparatus 1 according to the related art, which is the premise of the present disclosure, will be described with reference to FIGS. 1 to 4C. In the description below, the display surface side is assumed as the front side of a display apparatus 1, whereas the side opposite to the display surface is assumed as the back side of the display apparatus 1. It is further noted that only the profiles of components are illustrated in the drawings, not the details thereof, for the sake of convenience. The display apparatus 1 is, for example, a display apparatus provided with a touch panel function. The display apparatus 1 comprises a functional substrate 13 and a display device 14.

The functional substrate 13 is a substrate which functions as, for example, a touch panel. More specifically, the functional substrate 13 includes a touch sensor (not illustrated) of an electrostatic capacitance type, a resistance film type, an electromagnetic induction type or the like, which senses pressing force by a finger. The functional substrate 13 has a rectangular touch surface, and is located at the frontmost of the display apparatus 1. It is noted that the functional substrate 13 may be a decorative panel or the like.

The display device 14 is a device for displaying an image, and corresponds to, for example, a liquid crystal display, an organic light emitting diode (OLED) display, or a plasma display. According to the present embodiment, the display device 14 is described as a liquid crystal display. The display device 14 includes a display panel 141, a backlight 142, a casing 143 and the like, the casing 143 accommodating the display panel 141, the backlight 142 and so forth.

The display panel 141 is a liquid crystal panel, and has a display surface of e.g., a rectangular shape. The display panel 141 has a color filter substrate, a liquid crystal layer, an array substrate and so forth (not illustrated), to display an image. The display panel 141 is so disposed that the display surface thereof is opposed to the back surface of the functional substrate 13.

The backlight 142 is a backlight source located at the back surface of the display panel 141. The backlight 142 has a light source such as a while light emitting diode (LED), a fluorescent tube or the like, which irradiates the back surface of the display panel 141 with illumination light.

Figure 2:
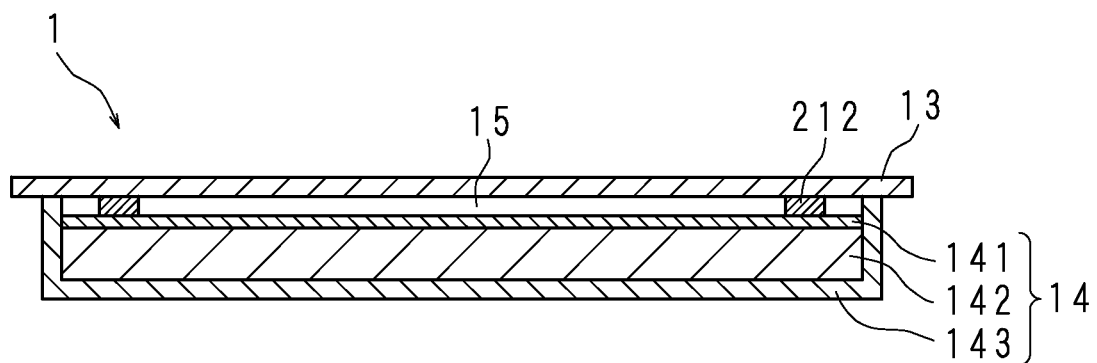
FIG. 2 is a section view illustrating a configuration example of a display apparatus according to the related art.

The casing 143 is a box having side surfaces and a bottom surface, one side thereof being open. The open side of the casing 143 has substantially the same rectangular shape as that of the display panel 141, while the casing 143 may accommodate the display panel 141 and the backlight 142 therein. As illustrated in FIG. 2, in the assembled state of the display apparatus 1, the display panel 141 and the backlight 142 are accommodated in the casing 143.

In the configuration examples illustrated in FIGS. 1 to 4C, the functional substrate 13 is bonded to the display panel 141 with adhesive resin 212. The adhesive resin 212 is, for example, moisture-curable resin, ultraviolet curable resin, thermosetting resin or the like. For the convenience of illustration, each of FIGS. 3A, 3B and FIGS. 4A to 4C illustrates the display apparatus 1 without the backlight 142 and the casing 143. As illustrated in FIG. 3A, at the time of assembling the display apparatus 1, first, adhesive resin 212 is applied, with a predetermined thickness, along the entire perimeter of the peripheral border of the display surface on the display panel 141. The "thickness" here means the length of the adhesive resin 212 in the direction perpendicular to the display surface of the display panel 141. Subsequently, the functional substrate 13 is placed on the display surface of the display panel 141, the adhesive resin 212 is cured, and thus the functional substrate 13 is adhered to the display panel 141 (see FIG. 3B). The display panel 141 is then accommodated in the casing 143, to assemble the display apparatus 1 (see FIG. 3C). The adhesive resin 212 is cured while forming a certain width in the front-back direction of the display apparatus 1, so that an air space 15 is formed between the functional substrate 13 and the display panel 141.

Figure 3A:
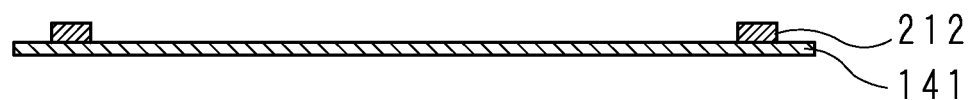
FIGS. 3A to 3C illustrate an example of a method of manufacturing the display apparatus according to the related art.
Figure 3B:
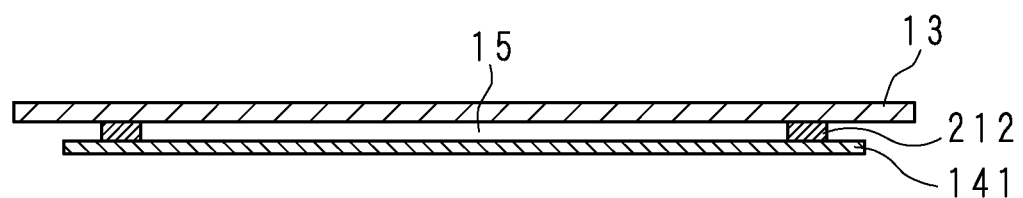
Figure 3C:
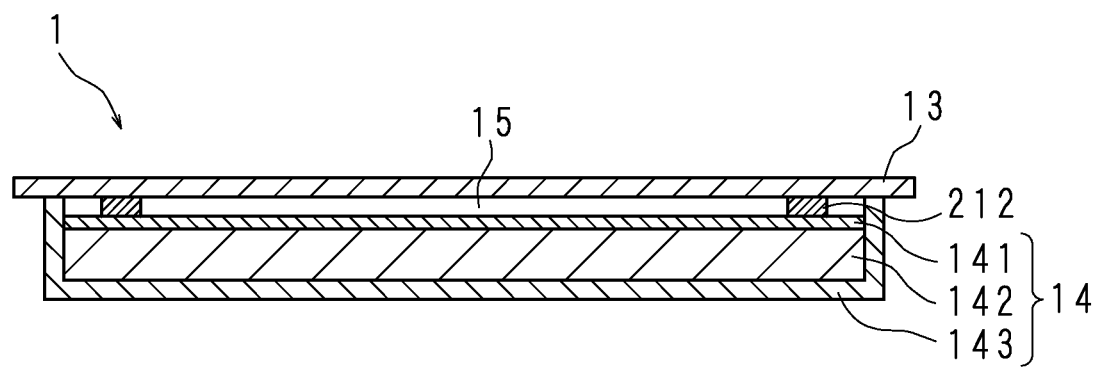
Figure 4A:
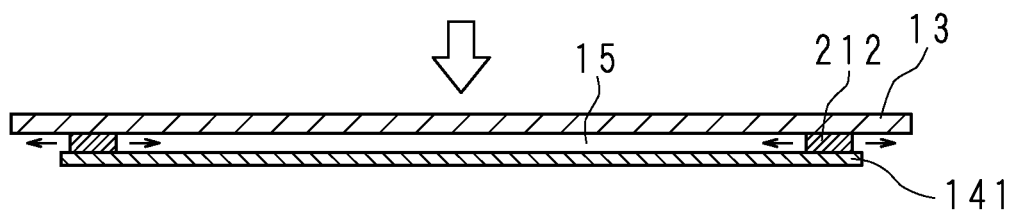
FIGS. 4A to 4C illustrate a problem of the related art.
Figure 4B:
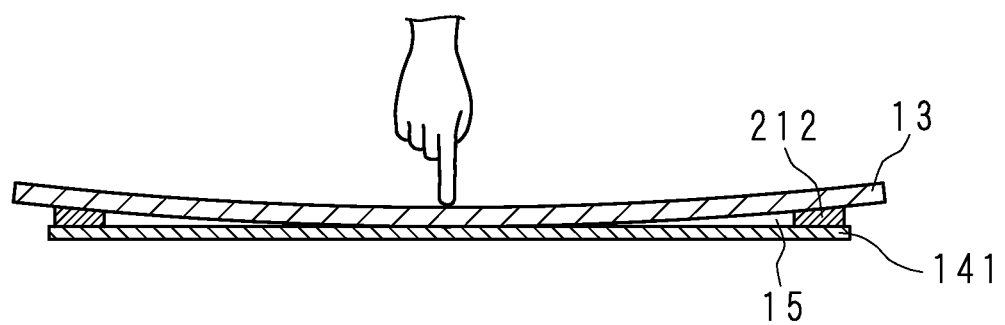
Figure 4C:
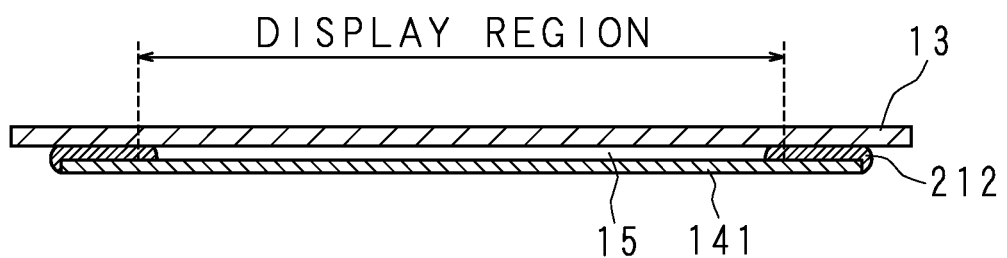

However, in the case where the functional substrate 13 and the display panel 141 are left in the state illustrated in FIG. 3B in order to cure the adhesive resin 212, the functional substrate 13 squashes the adhesive resin 212 because of its weight. As a result, the adhesive resin 212 wet-spreads in the internal and external directions (left-right directions in FIG. 4A) of the display apparatus 1, as illustrated in FIG. 4A. Then, the air space 15 between the functional substrate 13 and the display panel 141 cannot maintain a proper distance, decreasing in its thickness. Accordingly, if the user presses the surface of the functional substrate 13 as illustrated in FIG. 4B, the functional substrate 13 warps so that its back surface makes contact with the display surface of the display panel 141, causing display unevenness. Moreover, as illustrated in FIG. 4C, the adhesive resin 212 wet-spreads, causing problems that the resin spills over from the outer edge of the display panel 141 or spreads over the display region of the display panel 141. Accordingly, in the air gap bonding structure where the functional substrate 13 is bonded to the display panel 141 through the air space 15, the distance between the functional substrate 13 and the display panel 141 may not appropriately be maintained only by the adhesive resin 212.

According to the embodiments described below, therefore, in order to bond the functional substrate 13 to the display device 14 while maintaining an appropriate distance between them, a resin member for maintaining the distance between the functional substrate 13 and the display device 14 is employed to configure the air gap bonding structure.

Embodiment 1

Figure 5:
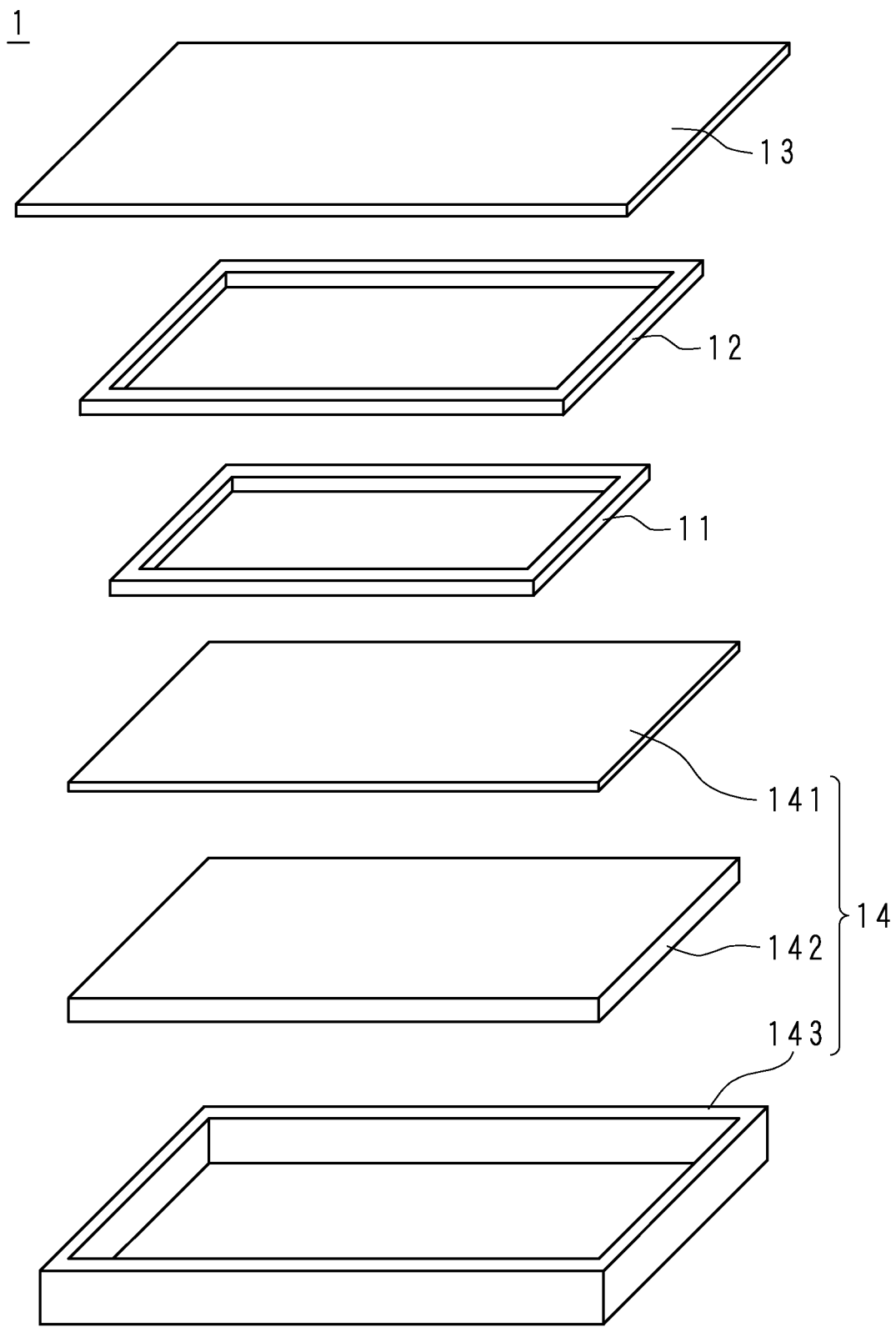
FIG. 5 is an exploded perspective view illustrating a configuration example of a display apparatus.
Figure 6:
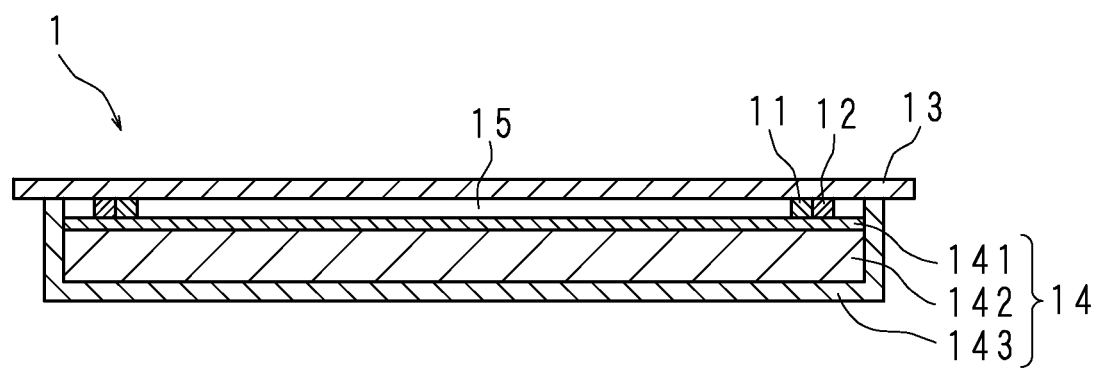
FIG. 6 is a section view illustrating a configuration example of the display apparatus.
Figure 7A:
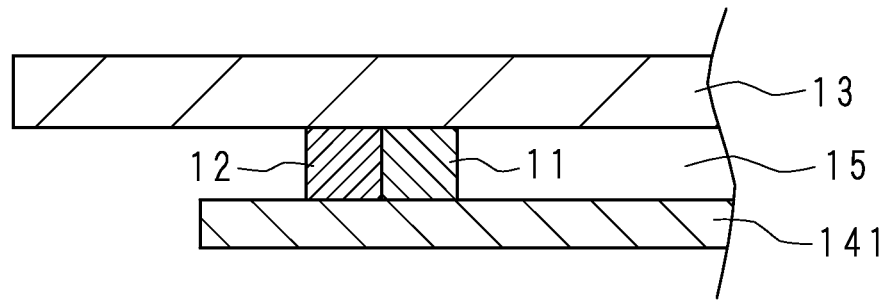
FIGS. 7A and 7B illustrate an example of an air gap bonding structure.
Figure 7B:
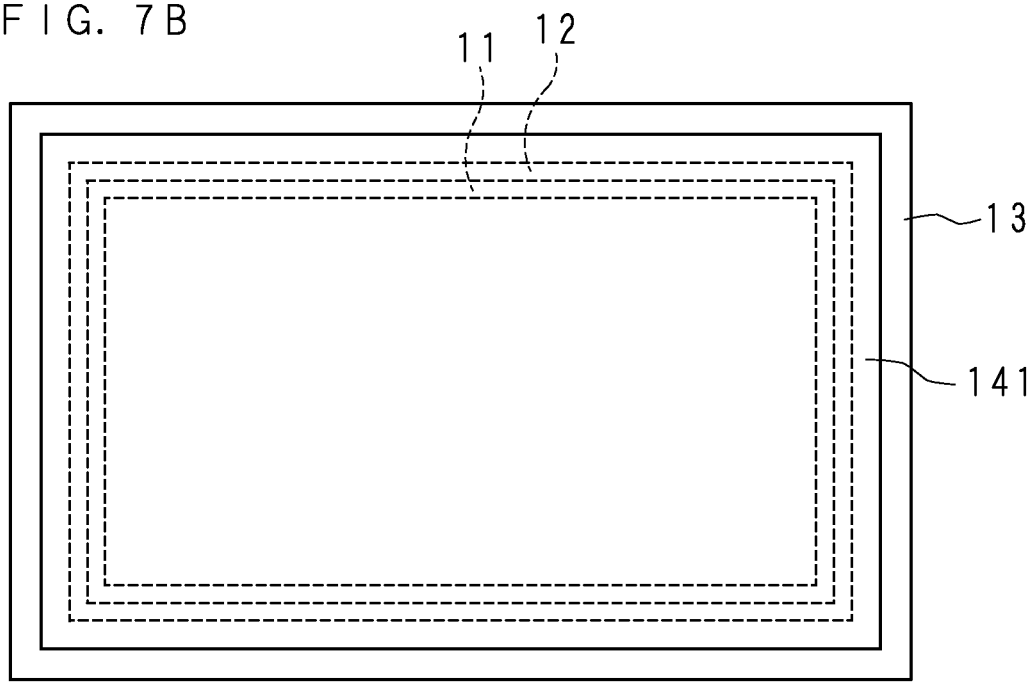

FIGS. 5 to 7B illustrate a configuration example of a display apparatus 1 according to the present embodiment. FIG. 5 is an exploded perspective view illustrating a configuration example of the display apparatus 1. FIG. 6 is a section view illustrating a configuration example of the display apparatus 1. FIG. 7A is a partial section view illustrating an example of the air gap bonding structure. FIG. 7B is a rear view illustrating an example of the air gap bonding structure. As illustrated in FIG. 5, the display apparatus 1 includes the first resin 11 and the second resin 12 in addition to the functional substrate 13 and the display device 14. The first resin 11 and the second resin 12 are located between the functional substrate 13 and the display panel 141, each having the shape of a rectangular frame. The first resin 11 and the second resin 12 are provided on the peripheral borders of opposed surfaces of the functional substrate 13 and the display panel 141 that are opposed to each other, along the entire perimeter thereof. That is, the first resin 11 and the second resin 12 are provided on the peripheral border of the back surface of the functional substrate 13 and the peripheral border of the display surface of the display panel 141 along the entire perimeter. As will be described later, the actual first resin 11 and second resin 12 in practice do not have rectangular cross sections, though FIGS. 5 to 7B illustrate that the first resin 11 and the second resin 12 have rectangular cross sections for the sake of convenience.

The second resin 12 is an adhesive member for adhering the functional substrate 13 to the display device 14. According to the present embodiment, the second resin 12 adheres the functional substrate 13 to the display panel 141. The second resin 12 is, for example, moisture-curable resin, ultraviolet curable resin, thermosetting resin and so forth, similarly to the adhesive resin 212 in the related art. According to the present embodiment, the second resin 12 is described as moisture-curable resin. More specifically, the second resin 12 is a composition including fluorine compounds, silicon compounds, acrylic compounds or the like. Preferably, the viscosity of the second resin 12 is approximately 1 to 400 Pa·s in view of the degree of freedom for the thickness direction, workability and the like. In the present embodiment, the second resin 12 is a composition including silicon compounds, having the viscosity of approximately 100 Pa·s.

The first resin 11 is a member for maintaining the distance between the functional substrate 13 and the display device 14. The first resin 11 may preferably be made of material which is hard to be squashed by, for example, the weight of the functional substrate 13 applied at the time of curing the second resin 12 or the load applied at the time of bonding the functional substrate 13 to the display device 14, and may employ UV-curable resin mainly containing urethane acrylate oligomer, for example. Furthermore, the first resin 11 may have the structural viscosity ratio of 4 to 8, approximately 6 for example, so as not to be squashed by the application and curing of the second resin 12 and to maintain the distance between the functional substrate 13 and the display device 14. Furthermore, the first resin 11 may preferably have the Shore OO hardness of approximately 10 to 50 after curing in view of, for example, the strength for maintaining the distance between the functional substrate 13 and the display device 14, and the workability in assembly of the display apparatus 1.

According to the present embodiment, the first resin 11 and the second resin 12 are in contact with each other. More specifically, as illustrated in FIGS. 6, 7A and so forth, the outer peripheral side surfaces of the first resin 11 formed in the shape of a rectangular frame is in contact with the inner peripheral side surfaces of the second resin 12 formed also in the shape of a rectangular frame. The first resin 11 and the second resin 12 are then in contact with the functional substrate 13 and the display panel 141.

Figure 8A:
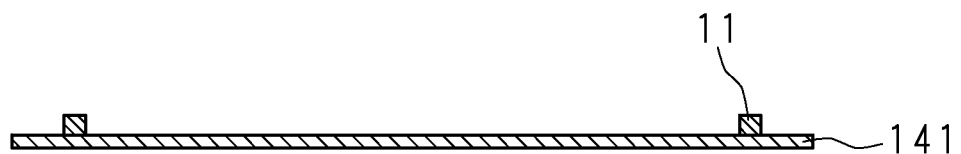
FIGS. 8A to 8D illustrate an example of a method of manufacturing the display apparatus.
Figure 8B:
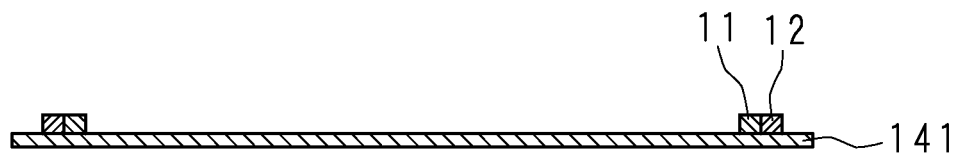
Figure 8C:
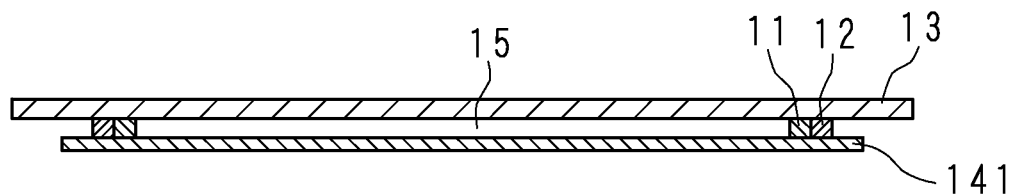
Figure 8D:
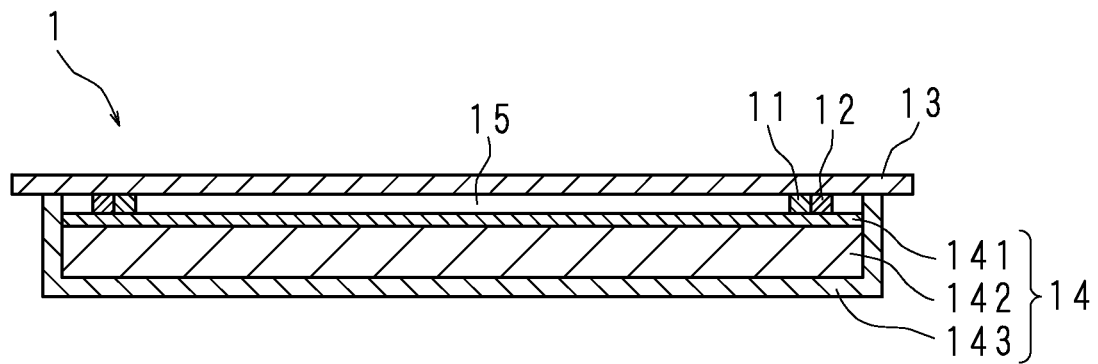

FIGS. 8A to 8D illustrate an example of a method of manufacturing the display apparatus 1. In the case where the display apparatus 1 is assembled, as illustrated in FIG. 8A, the first resin 11 is applied first to the peripheral border of the display surface of the display panel 141, i.e., the peripheral border of an opposed surface which will be opposed to the functional substrate 13 after assembly. It is noted that the first resin 11 is applied by a dispensing device (not illustrated). The first resin 11 is then irradiated with ultraviolet rays and cured. Subsequently, as illustrated in FIG. 8B, the second resin 12 is applied to the peripheral border of the display surface of the display panel 141. More specifically, the second resin 12 is applied by the dispensing device similarly to the first resin 11 so as to be in contact with the outer peripheral side surfaces of the first resin 11. Subsequently, as illustrated in FIG. 8C, the functional substrate 13 is placed over the display surface of the display panel 141 while the back surface of the functional substrate 13 is opposed to the display surface of the display panel 141. The second resin 12 is left in this state until it absorbs the moisture contained in the air and is cured. Accordingly, the second resin 12 adheres the functional substrate 13 to the display panel 141. That is, the functional substrate 13 is bonded to the display panel 141. The display panel 141 in the adhered state is then accommodated in the casing 143, to assemble the display apparatus 1, as illustrated in FIG. 8D.

Figure 9:
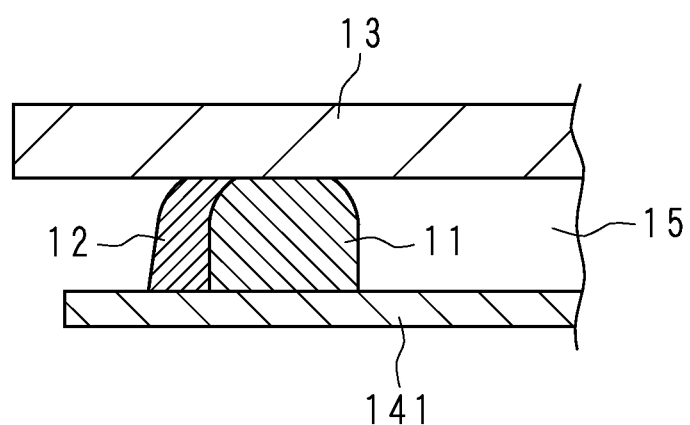
FIG. 9 is a partial section view illustrating an example of the air gap bonding structure.
Figure 10A:
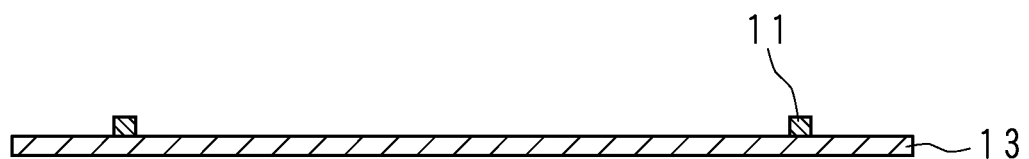
FIGS. 10A to 10D illustrate another example of a method of manufacturing the display apparatus.
Figure 10B:
Figure 10C:
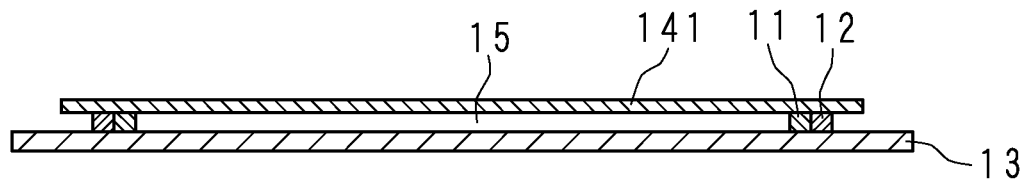
Figure 10D:
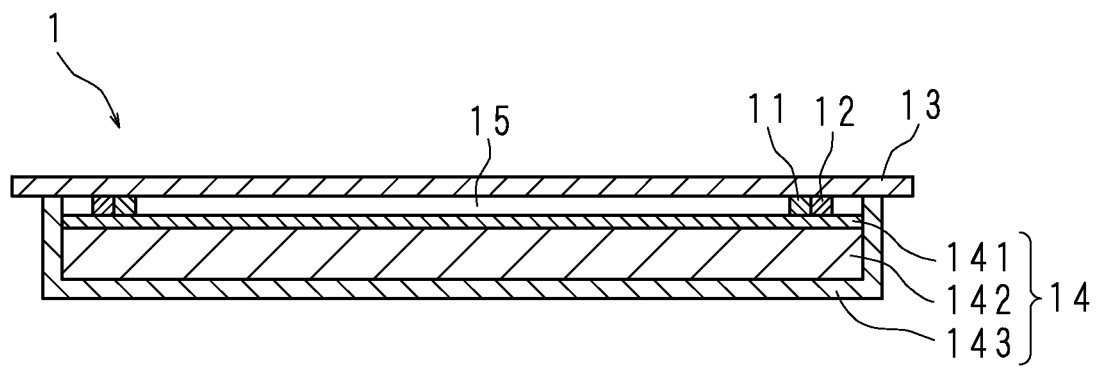

FIG. 9 illustrates the specific shapes of the first resin 11 and the second resin 12. In the case where curing of the second resin 12 proceeds while being in the state illustrated in FIG. 8C, the distance between the functional substrate 13 and the display panel 141 is maintained by the first resin 11. Thus, the second resin 12 is cured without being excessively squashed by the weight of the functional substrate 13. Here, the second resin 12 is affected by the surface tension or the like, and thus is cured without wet-spreading on the display surface of the display panel 141. More specifically, as illustrated in FIG. 9, the first resin 11 formed on the display surface of the display panel 141 is affected by the gravity force at the time of curing by the irradiation of ultraviolet rays (see FIG. 8A), and is formed in an U shape which protrudes toward the front side. In the case where the second resin 12 is applied in the form of being in contact with the first resin 11 to bond the display panel 141 to the functional substrate 13, the second resin 12 is cured in the form of being attached to the first resin 11. That is, the second resin 12 is affected by the surface tension, weight or the like and is cured with the sectional shape of a half arch along the outer peripheral side surfaces of the first resin 11.

As described earlier, the second resin 12 is cured while the first resin 11 maintains the distance between the functional substrate 13 and the display panel 141, thereby reducing a risk of the second resin 12 wet-spreading in the internal and external directions (left-right directions in FIG. 9) of the display apparatus 1 and spilling over from the outer edge of the display panel 141. Particularly, in the example described above, the second resin 12 is applied in the form of being in contact with the first resin 11. Since the second resin 12 is cured in the form of being attached to the first resin 11, the risk of wet-spreading in the external direction is further reduced. Moreover, the second resin 12 is dammed up by the first resin 11 and thus will not have a risk of wet-spreading in the internal direction.

Figure 11:
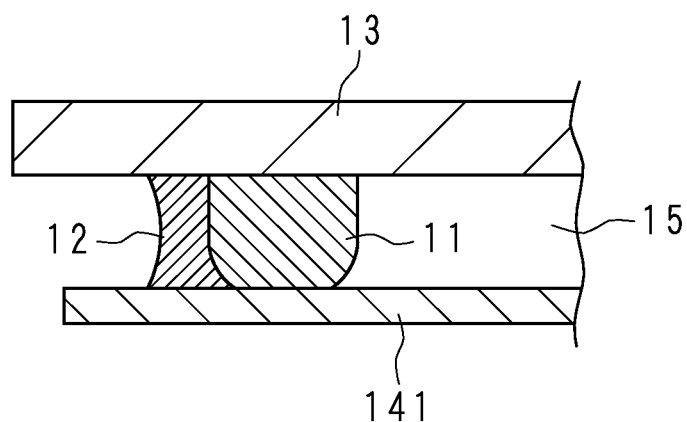
FIG. 11 is a partial section view illustrating another example of the air gap bonding structure.
Figure 12A:
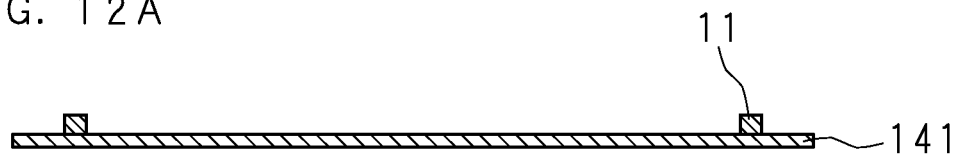
FIGS. 12A to 12D illustrate another example of the method of manufacturing the display apparatus.
Figure 12B:
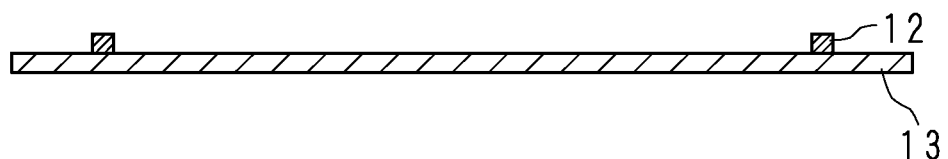
Figure 12C:
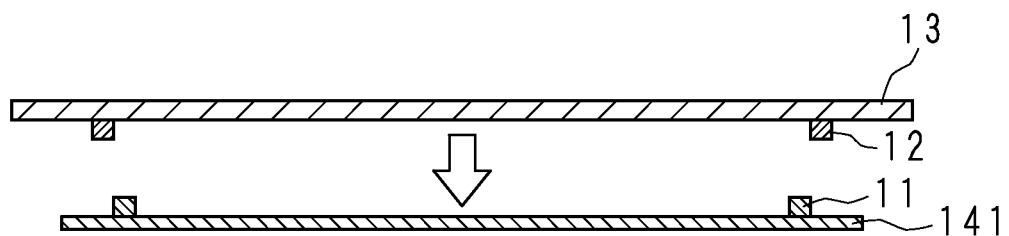
Figure 12D:
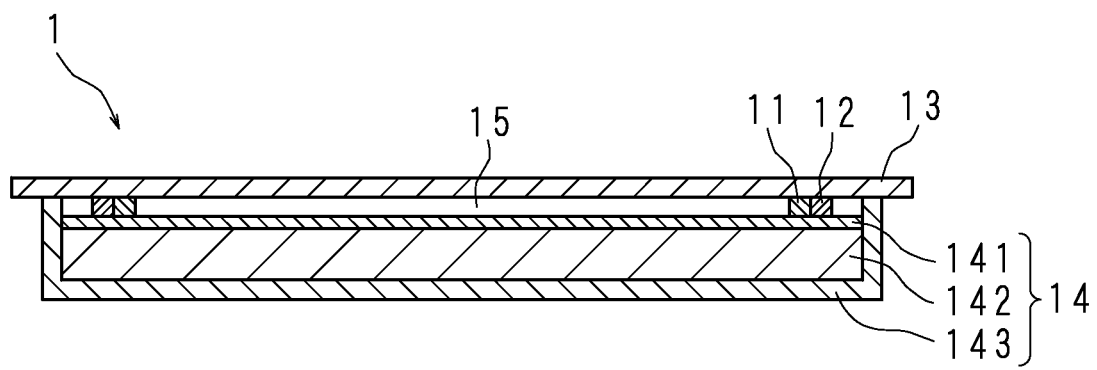

FIGS. 10A to 10D illustrate another example of a method of manufacturing the display apparatus 1. Though the first resin 11 and the second resin 12 are applied to the display panel 141 in FIGS. 8A to 8D, the first resin 11 and the second resin 12 are applied to the functional substrate 13 according to the manufacturing method illustrated in FIGS. 10A to 10D. The functional substrate 13 and the display panel 141 are then bonded together while being opposed to each other. Here, as illustrated in FIG. 11, the first resin 11 is formed in the U shape which protrudes toward the back side. In the case where the second resin 12 is applied while being in contact with the first resin 11 to bond the display panel 141 to the functional substrate 13, the second resin 12 is cured in the form of being attached to the first resin 11, as in the description above. Meanwhile, as the second resin 12 is sagged to the back side due to the action of gravity, the cross sectional shape thereof will not be a half arch like FIG. 9, but the outer peripheral side surface is curved inward and cured. Even with the manufacturing method illustrated in FIGS. 10A to 10D, the display panel 141 may be bonded to the functional substrate 13 by the second resin 12 while maintaining an appropriate distance by the first resin 11.

Figure 13:
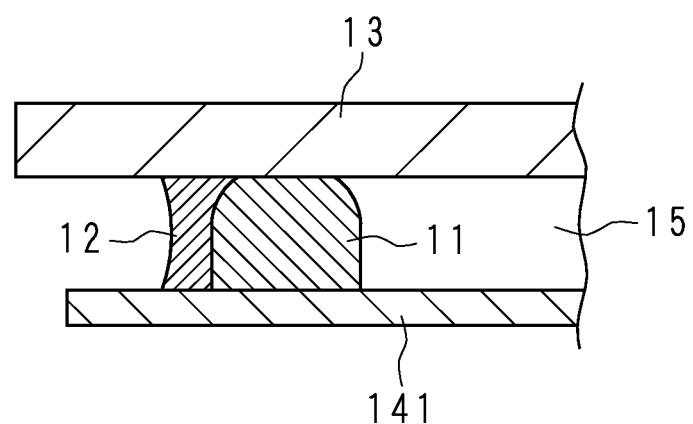
FIG. 13 is a partial section view illustrating another example of the air gap bonding structure.

FIGS. 12A to 12D illustrate another example of a method of manufacturing the display apparatus 1. In the case of the manufacturing method illustrated in FIGS. 12A to 12D, first, the first resin 11 is formed on the display surface of the display panel 141, and subsequently the second resin 12 is applied to the back surface of the functional substrate 13. The display surface of the display panel 141 and the back surface of the functional substrate 13 are then bonded together while being opposed to each other. Here, as illustrated in FIG. 13, the first resin 11 is formed in the U shape which protrudes toward the front side. By being applied to be in contact with the first resin 11, the second resin 12 is attached to the first resin 11 and is cured while its outer peripheral side surface is curved so as to be recessed inward, as in the description above. Even in the manufacturing method illustrated in FIGS. 12A to 12D, the functional substrate 13 may be bonded to the display panel 141 by the second resin 12 while maintaining an appropriate distance by the first resin 11.

Though the case where the first resin 11 is applied to the display panel 141 and the second resin 12 is applied to the functional substrate 13 is illustrated in FIGS. 12A to 12D, it is understood that the first resin 11 may also be applied to the functional substrate 13 and the second resin 12 may also be applied to the display panel 141.

As illustrated in FIGS. 8A to 13, by the method of manufacturing the display apparatus 1, the second resin 12 may be applied after curing the first resin 11, to bond the functional substrate 13 to the display panel 141. The other details as to which one of the first resin 11 and the second resin 12 is applied to either one of the functional substrate 13 and the display panel 141, for example, are not specifically limited.

Figure 14:
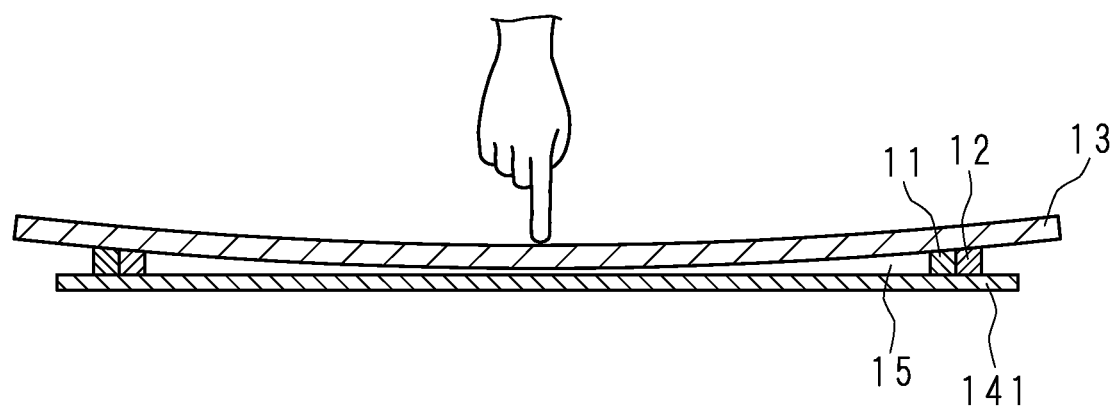
FIG. 14 illustrates the air gap bonding structure.

As such, the first resin 11 appropriately maintains the distance between the functional substrate 13 and the display panel 141. Accordingly, the second resin 12 is cured while maintaining an appropriate thickness to adhere the functional substrate 13 to the display panel 141. As illustrated in FIG. 14, therefore, even if the user presses the surface of the functional substrate 13 so that the functional substrate 13 is warped, the risk of the back surface of the functional substrate 13 being in contact with the display surface of the display panel 141 is reduced compared to the related art.

Figure 15:
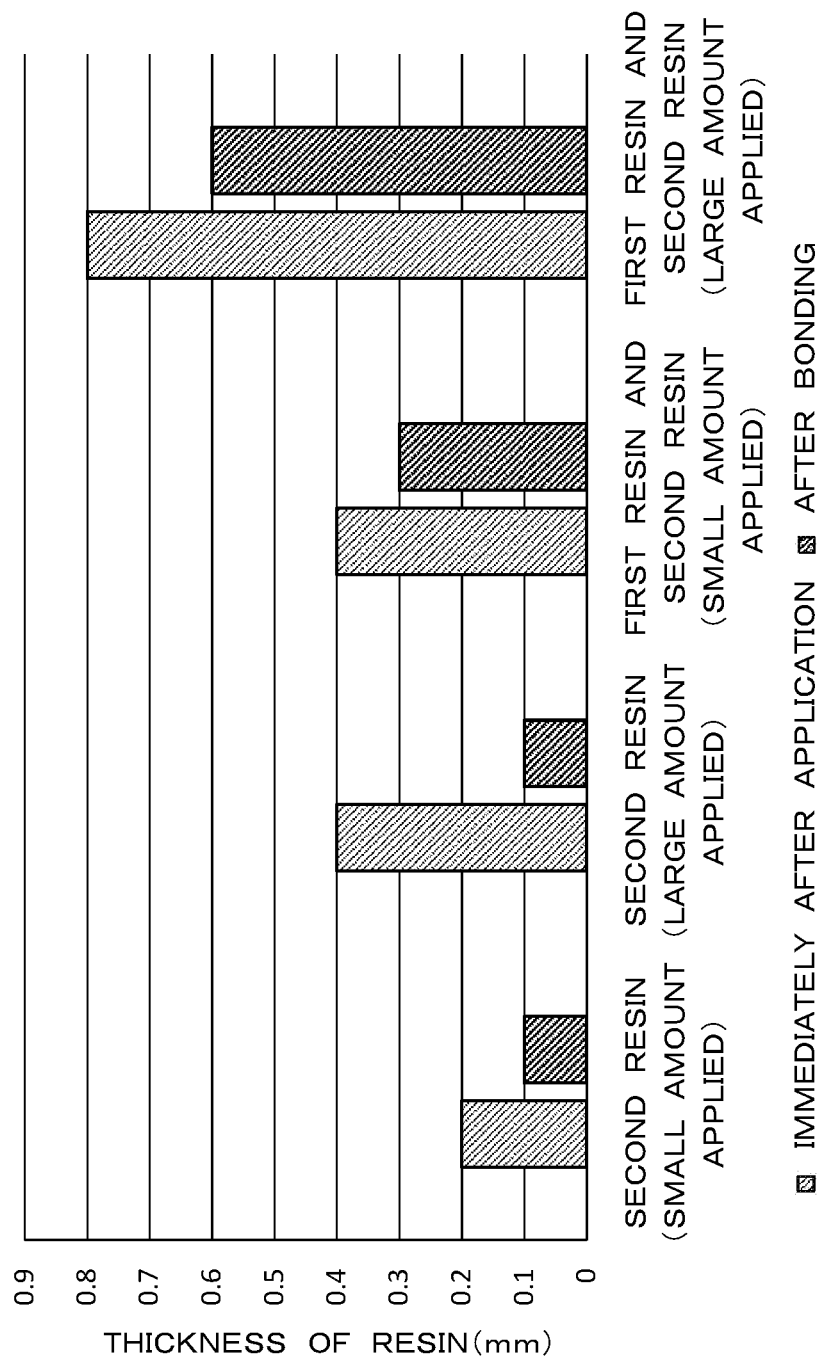
FIG. 15 is a graph illustrating a comparison example where comparison is made on the thickness of the second resin in the air gap bonding structure between the cases where the first resin is present and the first resin is absent.

FIG. 15 illustrates a comparison example where comparison is made on the thickness of the second resin 12 in the air gap bonding structure between the cases where the first resin 11 is present and the first resin 11 is absent. Here, the thickness of the second resin 12 (and the first resin 11) immediately after the second resin 12 is applied is compared with the thickness of the second resin 12 (and the first resin 11) after bonding the functional substrate 13 to the display panel 141. As illustrated in FIG. 15, in the case where the first resin 11 is absent, the second resin 12 is squashed by, for example, the load of the functional substrate 13 after bonding and the thickness thereof is reduced to half or less. More specifically, the thickness of the second resin 12 is more reduced as the amount of the applied second resin 12 is increased, causing a significant influence by the second resin 12 wet-spreading. In the case where the first resin 11 is present, on the other hand, the second resin 12 (and the first resin 11) after bonding has a thickness of three-quarters or more compared to the second resin 12 immediately after application regardless of the amount applied. That is, in the case where the first resin 11 is present, the reduced amount of the thickness of the second resin 12 is smaller compared to the case without the first resin 11. Accordingly, in the manufacturing step for the display apparatus 1, the dispensing device is controlled so as to apply the first resin 11 by an appropriate amount, so that the distance between the functional substrate 13 and the display panel 141 may be sufficient.

Figure 16A:
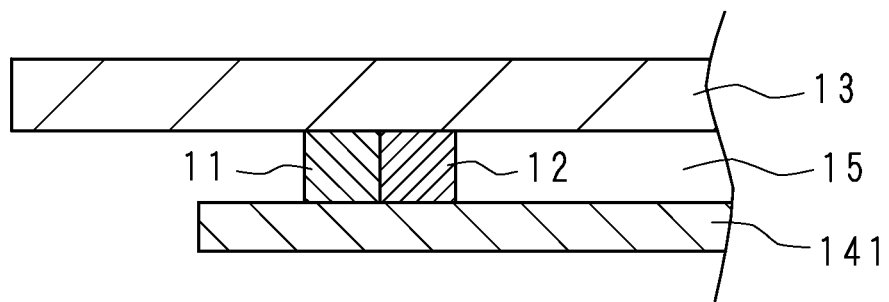
FIGS. 16A to 16C are partial section views illustrating another example of the air gap bonding structure.
Figure 16B:
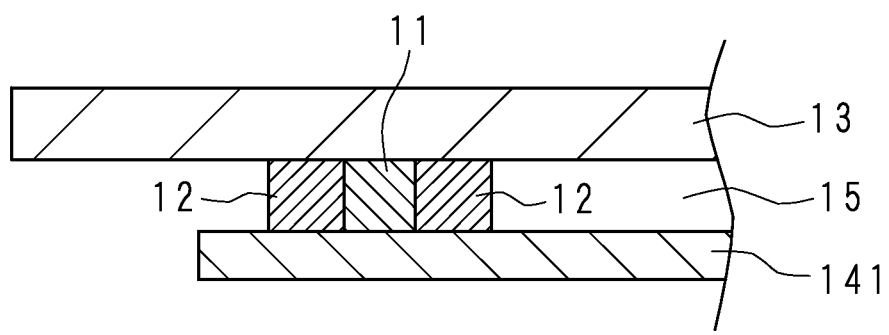
Figure 16C:
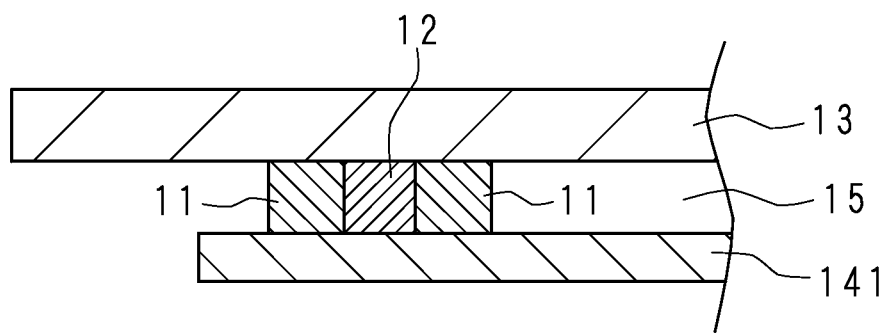

FIGS. 16A to 16C illustrate another example of the air gap bonding structure. Though a configuration where the first resin 11 is located at the inner side on the peripheral borders of the opposite surfaces of the functional substrate 13 and the display panel 141 whereas the second resin 12 is located at the outer side thereon has been described above, the display apparatus 1 according to the present embodiment is not limited thereto. For example, as illustrated in FIG. 16A, the first resin 11 may be located at the outer side and the second resin 12 may be located at the inner side. In the case where the air gap bonding structure illustrated in FIG. 16A is employed, after forming the first resin 11 at the peripheral border of the display panel 141 or the functional substrate 13, the second resin 12 is applied at the inner peripheral side of the first resin 11 on the display panel 141 or the functional substrate 13, to bond the display panel 141 and the functional substrate 13 together. Since the air gap bonding structure illustrated in FIG. 16A is similar to that in the structure illustrated in FIG. 7A except for the reversed positional relationship of the first resin 11 and the second resin 12, the method of manufacturing the display apparatus 1, the specific shapes of the first resin 11 and the second resin 12 and so forth will neither be illustrated nor be described.

Figure 17A:
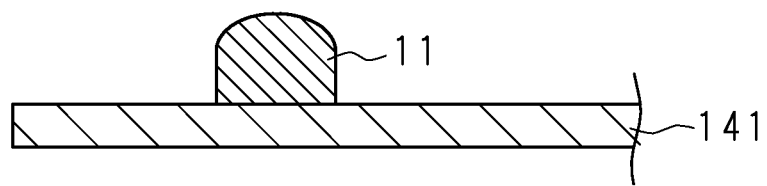
FIGS. 17A to 17C illustrate another example of the method of manufacturing the display apparatus.
Figure 17B:
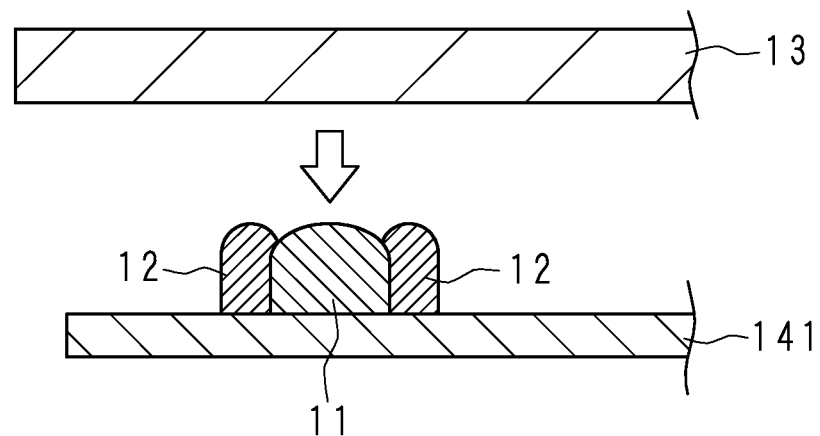
Figure 17C:
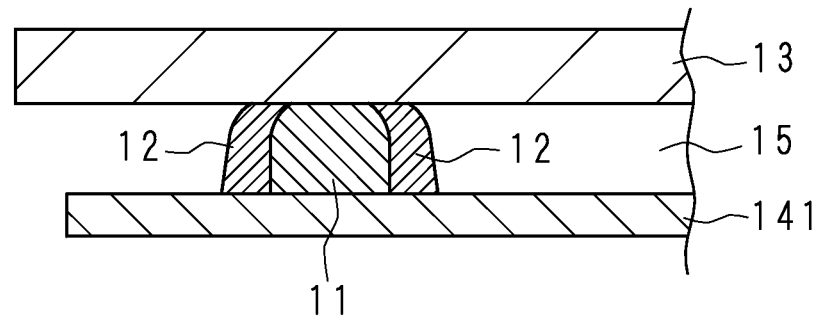

Furthermore, as illustrated in FIG. 16B, the first resin 11 may be located at the peripheral border, and the second resin 12 and 12 may be located on both sides of the first resin 11. Here, air gap bonding is carried out by the manufacturing method illustrated in FIGS. 17A to 17C, for example. In the description below, the manufacturing method will be illustrated only for the portions concerning the air gap bonding in order to simplify the illustration. As illustrated in FIGS. 17A to 17C, first, the first resin 11 is formed at the peripheral border of the display panel 141, and thereafter the second resin 12 and 12 are applied on both sides of the first resin 11. The display panel 141 and the functional substrate 13 are then bonded together while being opposed to each other. Accordingly, as illustrated in FIG. 17C, the second resin 12 is cured having an arch-like sectional shape, and adheres the functional substrate 13 to the display panel 141.

Figure 18A:
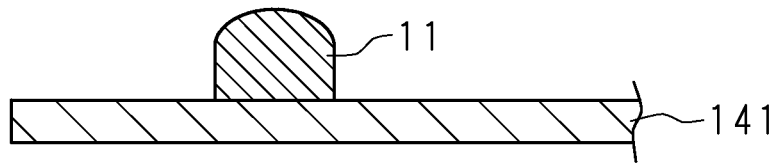
FIGS. 18A to 18D illustrate another example of the method of manufacturing the display apparatus.
Figure 18B:
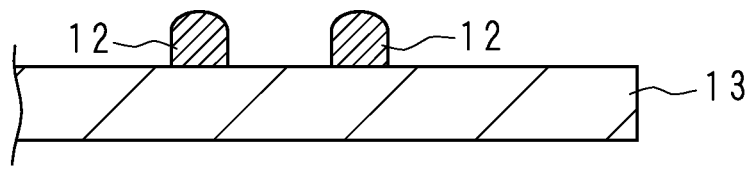
Figure 18C:
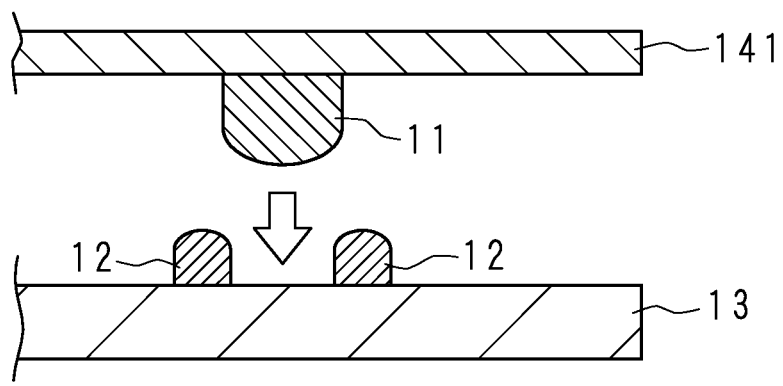
Figure 18D:
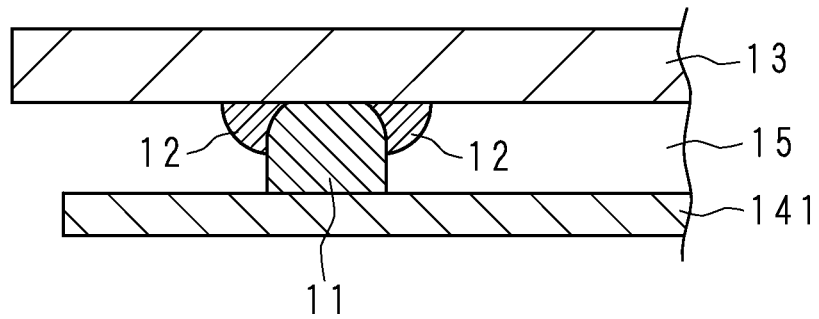

While FIG. 16B illustrates the second resin 12 being in contact with both the functional substrate 13 and the display panel 141, the present embodiment is not limited thereto. For example, the second resin 12 may also be only in contact with either one of the functional substrate 13 and the display panel 141. FIGS. 18A to 18D illustrate another example of a method of manufacturing the display apparatus 1. In this example, first, the first resin 11 is formed on the display surface of the display panel 141. Subsequently, the functional substrate 13 is placed on a working table with its back surface facing upward, and the second resin 12 is applied to the back surface of the functional substrate 13 with an amount of application so adjusted that the thickness of the final second resin 12 is less than the thickness of the first resin 11. The display panel 141 is then placed on the functional substrate 13 and is left for a predetermined period of time to cure the second resin 12. Here, since the second resin 12 is adjusted for the amount applied and thus is sagged to the back side of the functional substrate 13 due to the action of gravity, the thickness thereof is made smaller than that of the first resin 11. After the second resin 12 is cured, the functional substrate 13 and the display panel 141 are inverted to be in the state illustrated in FIG. 18D. In the air gap bonding structure illustrated in FIG. 18D, the first resin 11 is in contact with both the functional substrate 13 and the display panel 141, whereas the second resin 12 is only in contact with the functional substrate 13 but not in contact with the display panel 141. As illustrated in FIG. 18D, the thickness of the second resin 12 is less than the thickness of the first resin 11, and thus the second resin 12 is not in contact with the display panel 141. The second resin 12 however fixes the contact portion between the functional substrate 13 and the first resin 11 which is in contact with both the functional substrate 13 and the display panel 141, allowing the functional substrate 13 and the display panel 141 to be bonded together through the first resin 11.

Figure 19A:
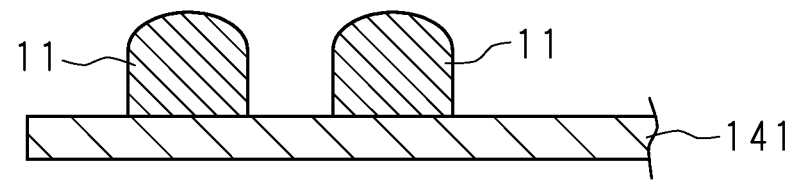
FIGS. 19A to 19C illustrate another example of the method of manufacturing the display apparatus.
Figure 19B:
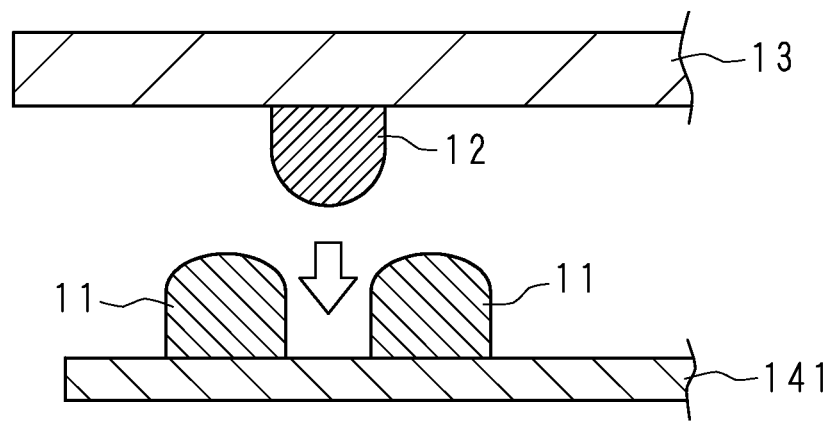
Figure 19C:
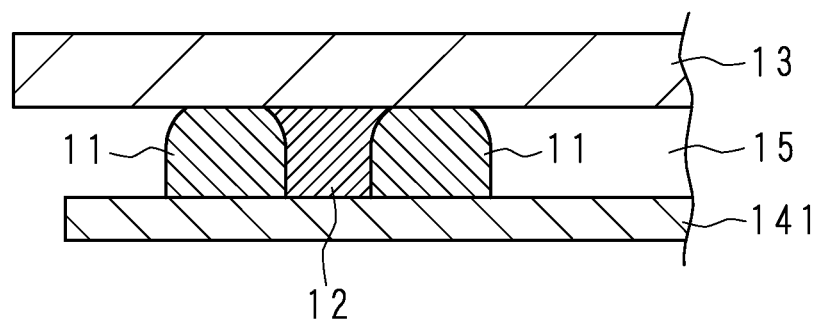

Furthermore, as illustrated in FIG. 16C for example, the first resin 11 and 11 may be provided while being separated from each other and the second resin 12 may be located between the first resin 11 and 11. Here, as illustrated in FIGS. 19A to 19C for example, first, the first resin 11 and 11 are formed at the peripheral border of the display panel 141 while being separated from each other, and thereafter the functional substrate 13 on which the second resin 12 is applied is bonded to the display panel 141. Accordingly, as illustrated in FIG. 19C, the second resin 12 provided between the first resin 11 and 11 adheres the functional substrate 13 to the display panel 141. Even with the configuration described above, an effect similar to the earlier examples may be produced.

According to Embodiment 1, therefore, the display apparatus 1 includes the first resin 11 for maintaining the distance between the display device 14 and the functional substrate 13. Since the air gap bonding may be carried out using a resin member which is inexpensive and is easy to automate the bonding, the present embodiment is superior to the case where the double-sided tape is used in terms of manufacturing cost and productivity. Moreover, by the presence of the first resin 11, an air space 15 of an appropriate distance is interposed between the display device 14 and the functional substrate 13, preventing the occurrence of display unevenness caused by pressing the functional substrate 13. Furthermore, an adhesive made of resin has adhesion strength higher than that of the double-sided tape using acrylic foam, so that sufficient adhesion strength per unit area for the display panel 141 and the functional substrate 13 may be secured. In addition, the adhesion area of the adhesive member occupying the peripheral borders of the opposite surfaces of the display panel 141 and the functional substrate 13 may be made smaller, and thus the display apparatus 1 with slim border may be attained.

According to Embodiment 1, the second resin 12 is cured in the form of being attached to the first resin 11 because the first resin 11 is in contact with the second resin 12. It is thus possible to further suppress wet-spreading of the second resin 12, and to attain an improved slim border structure.

According to Embodiment 1, as the Shore OO hardness of the first resin 11 is in the range of 10 to 50, the first resin 11 may be configured not to be easily squashed such that the distance between the display device 14 and the functional substrate 13 may appropriately be maintained.

According to Embodiment 1, as the second resin 12 is applied to bond the display device 14 to the functional substrate 13 after the first resin 11 is formed, the second resin 12 adheres the functional substrate 13 to the display panel 141 while the first resin 11 maintains the distance between the display device 14 and the functional substrate 13. By the presence of the first resin 11, the air space 15 of an appropriate distance is interposed between the display device 14 and the functional substrate 13, which can prevent the occurrence of display unevenness caused by pressing the functional substrate 13. Moreover, the second resin 12 is cured in the state where an appropriate distance is maintained by the first resin 11, so that wet-spreading of the second resin 12 may be suppressed while a slim border structure may be attained.

According to Embodiment 1, as the structural viscosity ratio of the first resin 11 is in the range of 4 to 8, the first resin 11 may be configured not to be easily squashed by a load, and thus the distance between the display device 14 and the functional substrate 13 may appropriately be maintained.

Embodiment 2

In the present embodiment, a configuration where the first resin 11 and the second resin 12 are separated from each other will be described. Parts corresponding to those in Embodiment 1 will be denoted by the same reference numerals in the drawings and the description thereof will not be repeated.

Figure 20A:
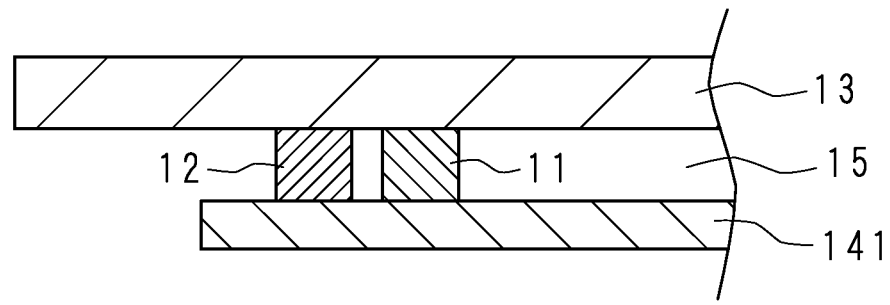
FIGS. 20A and 20B illustrate an example of an air gap bonding structure according to Embodiment 2.
Figure 20B:
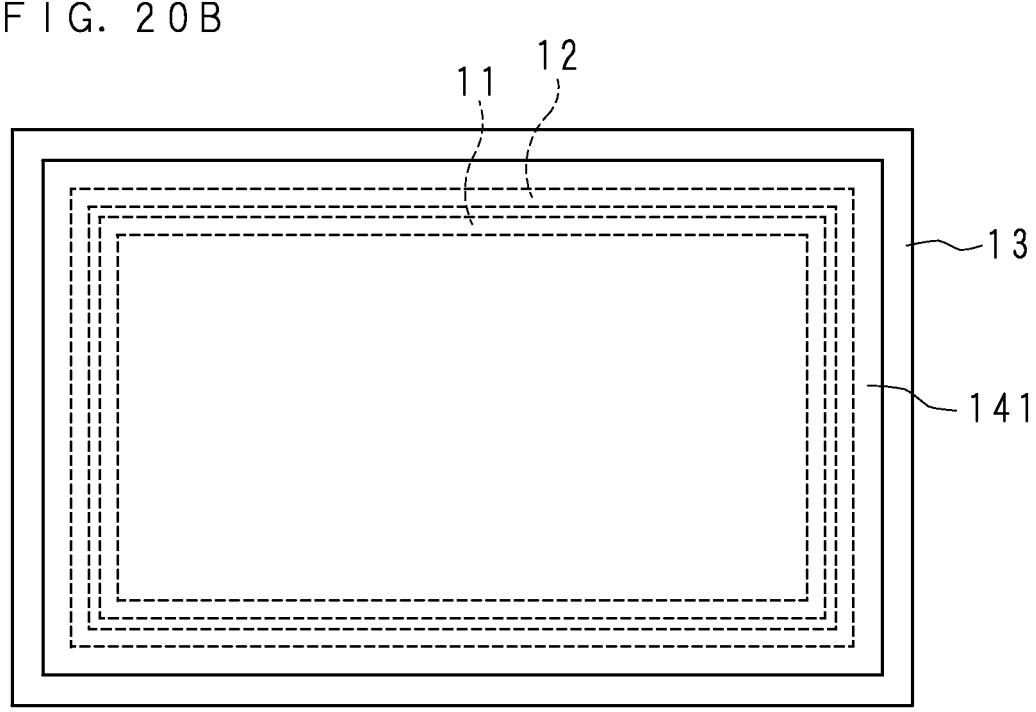

FIGS. 20A and 20B illustrate configuration examples of the display apparatus 1 according to Embodiment 2. FIG. 20A is a partial section view illustrating an example of an air gap bonding structure according to Embodiment 2. FIG. 20B is a rear view illustrating an example of the air gap bonding structure according to Embodiment 2. According to the present embodiment, the outer peripheral side surface of the first resin 11 is not in contact with the inner peripheral side surface of the second resin 12, and a small gap is present between the first resin 11 and the second resin 12. More specifically, as illustrated in FIGS. 20A and 20B, the first resin 11 having a rectangular frame shape is provided at the peripheral borders of the functional substrate 13 and the display panel 141. Likewise, the second resin 12 of a rectangular frame shape has an inner peripheral side surface substantially in parallel with the outer peripheral side surface of the first resin 11, and is provided at the peripheral borders of the functional substrate 13 and the display panel 141 with a distance from the outer peripheral side surface of the first resin 11. That is, the first resin 11 and the second resin 12 are separated from each other.

Figure 21A:
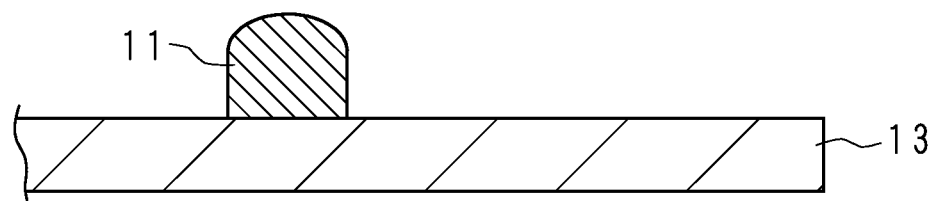
FIGS. 21A to 21D illustrate an example of a method of manufacturing a display apparatus according to Embodiment 2.
Figure 21B:
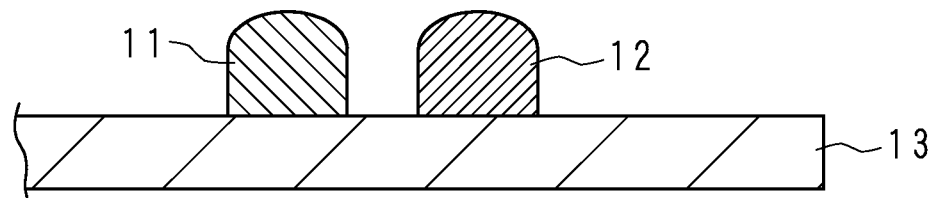
Figure 21C:
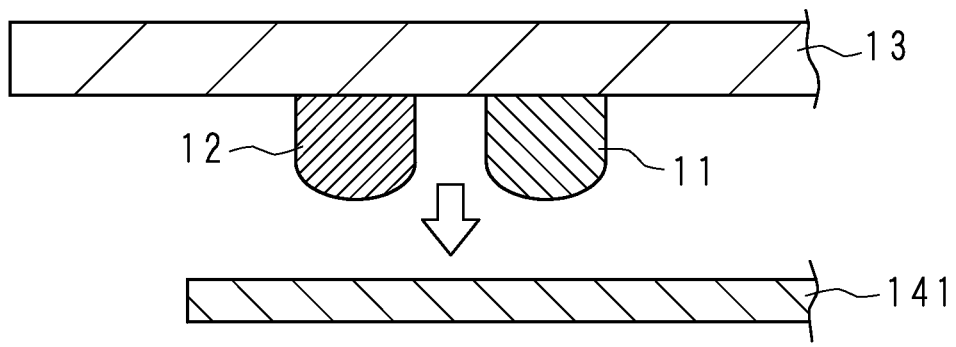
Figure 21D:
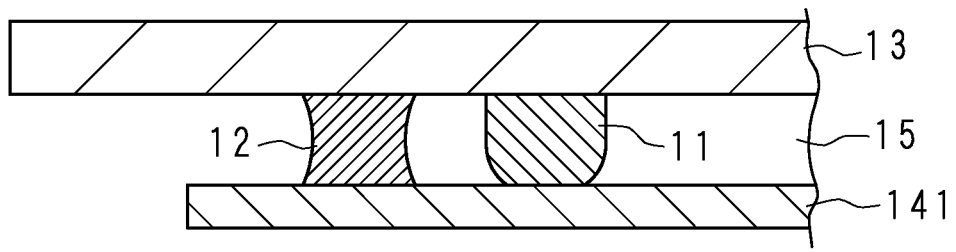

FIGS. 21A to 21D illustrate an example of a method of manufacturing the display apparatus 1 according to Embodiment 2. In the case of the structure as illustrated in FIGS. 20A and 20B, for example, the first resin 11 is formed at the peripheral border of the functional substrate 13, and thereafter the second resin 12 is applied on the outer side of the first resin 11. The functional substrate 13 is then bonded to the display panel 141 and is left for a predetermined period of time to cure the second resin 12. Here, as illustrated in FIG. 21D, the second resin 12 forms curved surfaces that are recessed inward on the outer peripheral side surface and on the inner peripheral side surface, due to the function of surface tension and so on, and is cured in the external and internal directions of the display apparatus 1 without wet-spreading. Though the first resin 11 and the second resin 12 are applied to the functional substrate 13 in FIGS. 21A to 21D, it is understood that they may alternatively be applied to the display panel 141.

Moreover, as illustrated in FIG. 22A for example, the first resin 11 is applied to the display panel 141 and the second resin 12 is applied to the functional substrate 13, to bond the display panel 141 to the functional substrate 13. Moreover, as illustrated in FIG. 22B for example, the first resin 11 is applied to the functional substrate 13 and the second resin 12 is applied to the display panel 141, to bond the display panel 141 and the functional substrate 13 together. As such, the method of manufacturing the display apparatus 1 according to the present embodiment is to provide the first resin 11 and the second resin 12 separated from each other, but does not limit the other details as to which one of the first resin 11 and the second resin 12 is applied to either one of the functional substrate 13 and the display panel 141, for example.

Since the first resin 11 and the second resin 12 are separated from each other, even in the case where the combination of the first resin 11 and the second resin 12 causes a change in the properties thereof, no change occurs because the first resin 11 and the second resin 12 are not in contact with each other. Accordingly, the first resin 11 and the second resin 12 have a higher degree of freedom for the combination thereof. Furthermore, as in Embodiment 1, sufficient adhesion strength per unit area may be ensured while an appropriate distance between the display device 14 and the functional substrate 13 is secured.

Figure 23A:
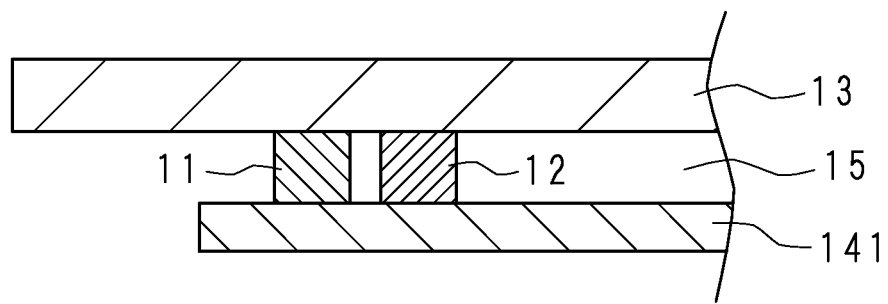
FIGS. 23A to 23C are partial section views illustrating another example of the air gap bonding structure according to Embodiment 2.
Figure 23B:
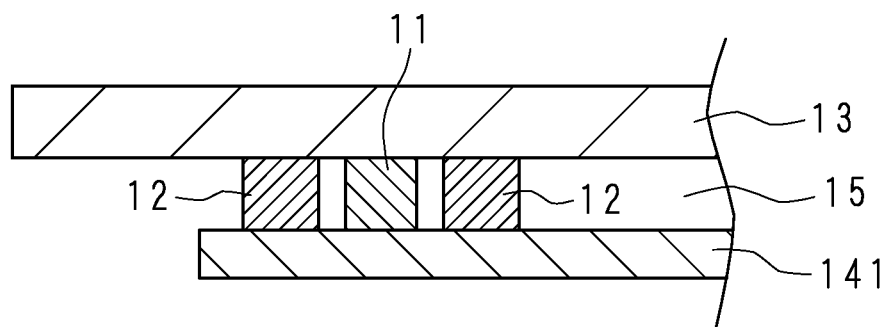
Figure 23C:
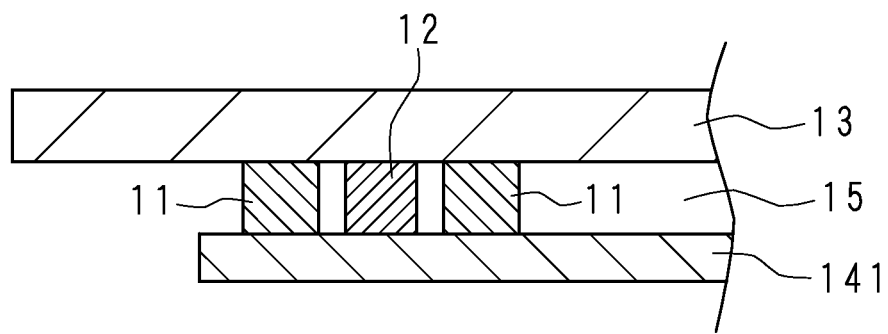

FIGS. 23A to 23C illustrate another example of the air gap bonding structure according to Embodiment 2. As illustrated in FIG. 23A, the first resin 11 may be located at the outer side on the peripheral borders of the functional substrate 13 and the display panel 141, and the second resin 12 may be located at the inner side on the peripheral borders thereof. Furthermore, as illustrated in FIG. 23B, the first resin 11 may be located at the peripheral border, and the second resin 12 and 12 may be located on both sides of the first resin 11 while being separated from the first resin 11. Furthermore, as illustrated in FIG. 23C, the first resin 11 and 11 may be provided while being separated from each other, and the second resin 12 may be located between the first resin 11 and 11 while being separated from the first resin 11 and 11. The configuration illustrated in FIGS. 23A to 23C produces an effect similar to the examples above.

According to Embodiment 2, therefore, the first resin 11 is separated from the second resin 12, which increases the degree of freedom for the combination of the first resin 11 and the second resin 12.

Embodiment 3

Figure 24:
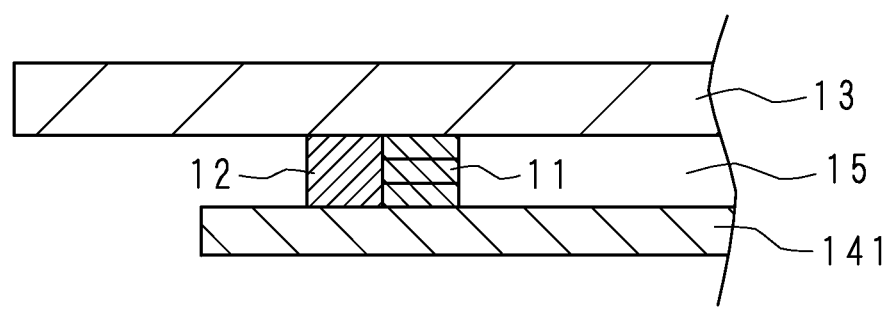
FIG. 24 is a partial section view illustrating an example of an air gap bonding structure according to Embodiment 3.

In the present embodiment, a configuration where the first resin 11 or the second resin 12 has a multi-layered structure will be described. FIG. 24 illustrates an example of an air gap bonding structure where the first resin 11 or the second resin 12 has a multi-layered structure. FIG. 24 has the first resin 11 with a three-layered structure. It is noted that the multi-layered structure may have two, four or more layers.

Figure 25A:
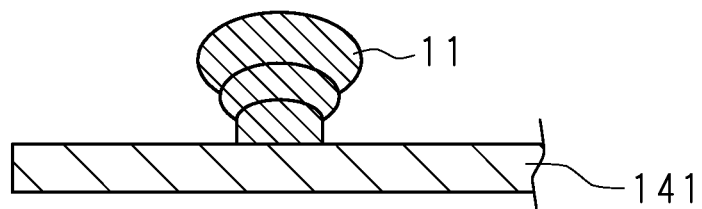
FIGS. 25A to 25C illustrate an example of a method of manufacturing a display apparatus according to Embodiment 3.
Figure 25B:
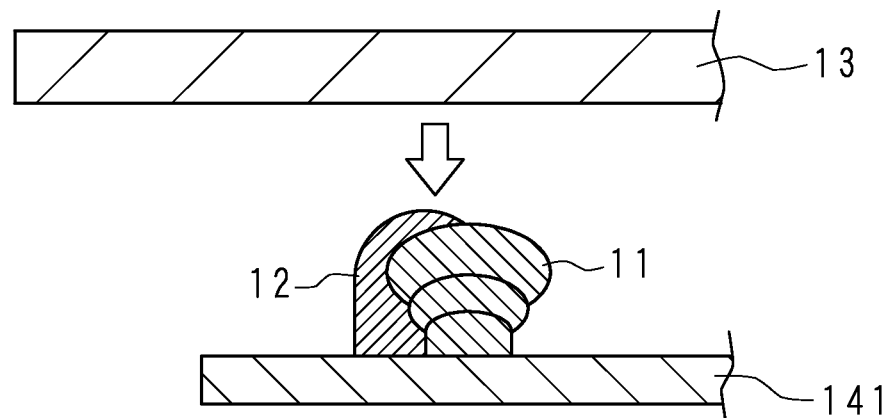
Figure 25C:
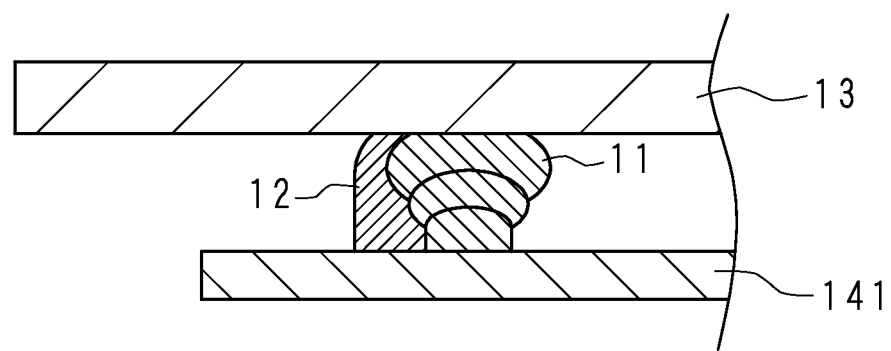

In the case of the configuration as illustrated in FIG. 24, first, the first resin 11 is formed by applying and curing the first resin 11 layer by layer at the peripheral border of the display panel 141, as illustrated in FIGS. 25A to 25C for example. As illustrated in FIG. 25A, the amount of the applied first resin 11 may be adjusted so as to be gradually increased toward the front side in order to suppress the second resin 12 wet-spreading at the time of bonding. Subsequently, the second resin 12 is applied so as to be in contact with the first resin 11 which has a multi-layered structure. The functional substrate 13 is then bonded to the display panel 141 to form the air gap bonding structure. In the case where the second resin 12 is cured in the state illustrated in FIG. 25C, the second resin 12 is affected by the force of gravity and is sagged to the back side. Wet-spreading of the second resin 12 may however be suppressed, since the layer of the first resin 11 is made smaller toward the back side.

Figure 26A:
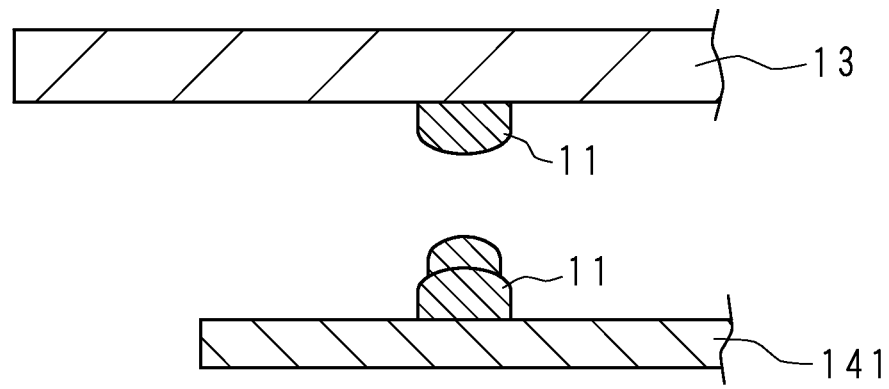
FIGS. 26A to 26C illustrate another example of the method of manufacturing the display apparatus according to Embodiment 3.
Figure 26B:
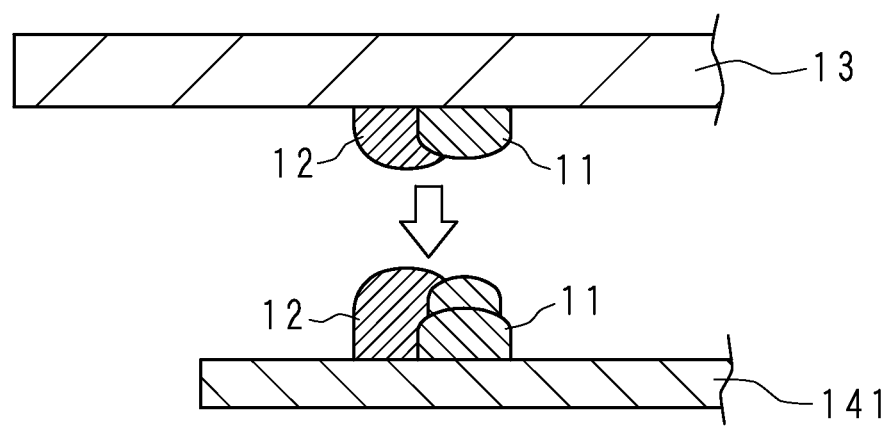
Figure 26C:
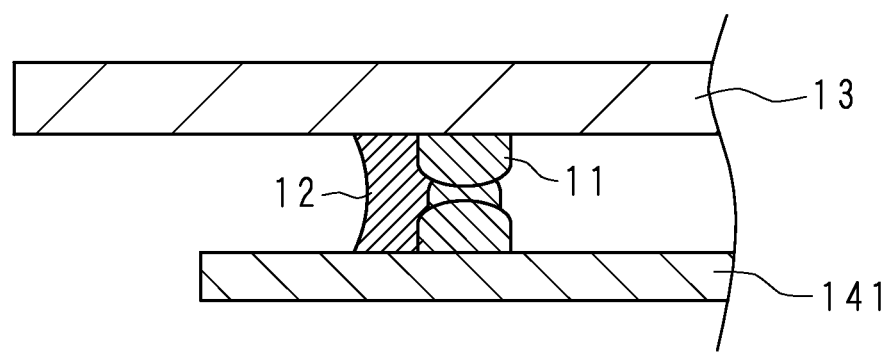

FIGS. 26A to 26C illustrate another example of a method of manufacturing a display apparatus 1 according to Embodiment 3. Though the first resin 11 and the second resin 12 are applied to the display panel 141 in FIGS. 25A to 25C, the first resin 11 and the second resin 12 are applied to both the display panel 141 and the functional substrate 13 according to the manufacturing method illustrated in FIGS. 26A to 26C. More specifically, as illustrated in FIG. 26A, first, two layers of the first resin 11 is formed on the display panel 141, and one layer of the first resin 11 is formed on the functional substrate 13. In such a case, the first resin 11 located in the intermediate layer may be reduced in the amount to be applied compared to the first resin 11 concerning the other layers such that the second resin 12 will not wet-spread at the time of bonding. Subsequently, as illustrated in FIG. 26B, the second resin 12 is applied to the display panel 141 and the functional substrate 13 in the form of being in contact with the first resin 11, to bond the display panel 141 to the functional substrate 13. Accordingly, as illustrated in FIG. 26C, the first resin 11 is formed in the state of three layers. Moreover, the second resin 12 and 12 applied to both the display panel 141 and the functional substrate 13 form one integrated part by bonding. The second resin 12 is affected by the surface tension or the like so that the outer peripheral side surface is curved inward and cured, to adhere the functional substrate 13 to the display panel 141. Since the first resin 11 in the intermediate layer has a smaller amount of application compared to that of the first resin 11 concerning the other layers, the first resin 11 has a cross-section where the intermediate portion is thinner than the other portions, which can prevent the second resin 12 from wet-spreading.

The multi-layered structure of the first resin 11 as described above allows the first resin 11 to securely have an appropriate thickness even in the case where increase in the distance between the display device 14 and the functional substrate 13 is desired, or where the first resin 11 cannot be formed in a required thickness by only one application.

Figure 27A:
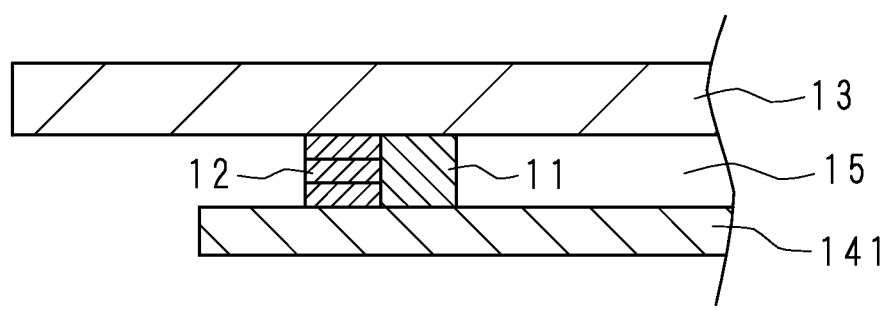
FIGS. 27A and 27B are partial section views illustrating another example of the air gap bonding structure according to Embodiment 3.
Figure 27B:
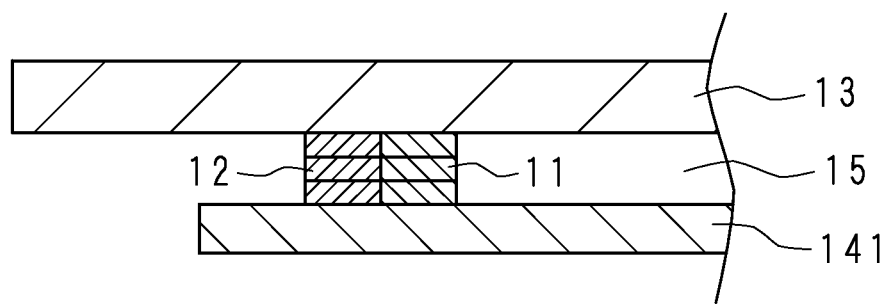

As illustrated in FIG. 27A, the second resin 12 may be made to have a multi-layered structure. As illustrated in FIG. 27B, both the first resin 11 and the second resin 12 may have multi-layered structures. This can secure an appropriate thickness of the second resin 12.

Figure 28:
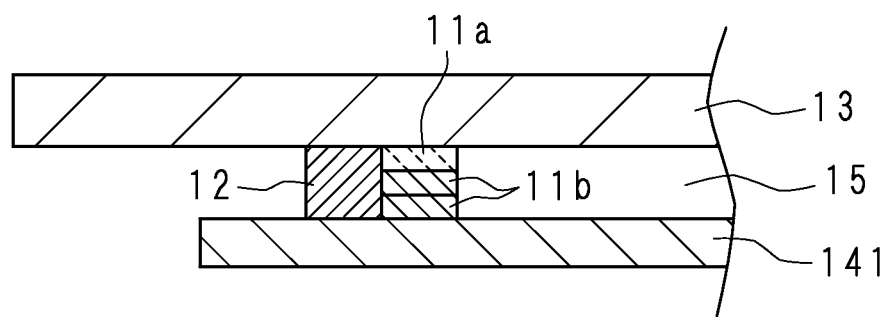
FIG. 28 is a partial section view illustrating another example of the air gap bonding structure according to Embodiment 3.
Figure 29:
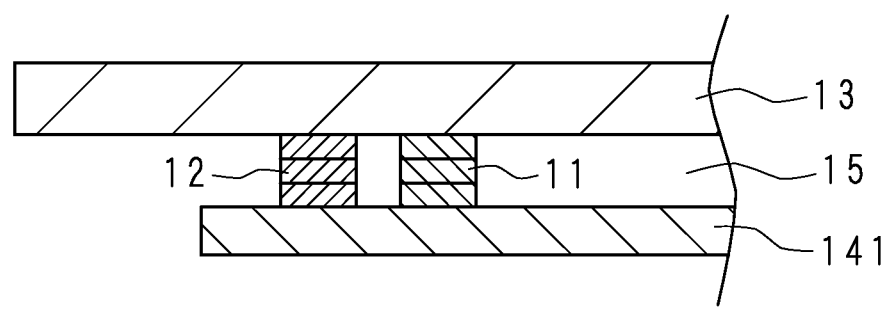
FIG. 29 is a partial section view illustrating another example of the air gap bonding structure according to Embodiment 3.

Furthermore, as illustrated in FIG. 28, the first resin 11a concerning a part of the layers may be made of resin with a structural viscosity ratio, a Shore OO hardness and the like that are different from those of the first resin 11b concerning the other layers. As illustrated in FIG. 29, the first resin 11 and the second resin 12 formed in multi-layered structures may be separated from each other. It is noted that the positional relationship of the first resin 11 and the second resin 12 may be reversed in the air gap bonding structure illustrated in FIG. 29. Moreover, another resin may be provided on both sides of one resin.

According to Embodiment 3, the first resin 11 or the second resin 12 may have a multi-layered structure, so that a necessary distance may easily be formed between the display device 14 and the functional substrate 13.

Embodiment 4

In the present embodiment, a configuration where the first resin 11 or the second resin 12 is provided at a part of the peripheral border of the display panel 141 and the functional substrate 13 will be described.

FIGS. 30A to 30D illustrate a configuration example of a display apparatus 1 according to Embodiment 4. In Embodiment 1, the first resin 11 and the second resin 12 are provided on the peripheral borders of the opposite surfaces of the display panel 141 and the functional substrate 13 along the entire perimeter. As illustrated in FIGS. 30A to 30D, however, the first resin 11 or the second resin 12 may alternatively be provided only at a part of the peripheral borders of the opposite surfaces of the display panel 141 and the functional substrate 13. In the case of the configuration example illustrated in FIG. 30A, the first resin 11 is provided along the entire perimeter while the second resin 12 is provided only at parts of the peripheral border. More specifically, the first resin 11 is provided in the shape of a rectangular frame along the entire perimeter of the peripheral border. The second resin 12 is provided at multiple parts of the peripheral border in the form of being in contact with the four corners of the first resin 11 having the shape of a rectangular frame and with the outer peripheral side surfaces of the first resin 11 at the middle parts of the four sides. The second resin 12 provided at the four corners and the middle parts of the four sides of the rectangular frame concerning the first resin 11 can securely adhere the functional substrate 13 to the display panel 141. It is noted that the positions of the second resin 12 are not limited to those described above, but the second resin 12 may only be provided, for example, at the middle parts of the four sides of the first resin 11. Even with the configuration where the second resin 12 is provided only at a part of the peripheral border as described above, the second resin 12 may serve to adhere the functional substrate 13 to the display device 14 while the first resin 11 appropriately maintains the distance between the display device 14 and the functional substrate 13.

Figure 30A:
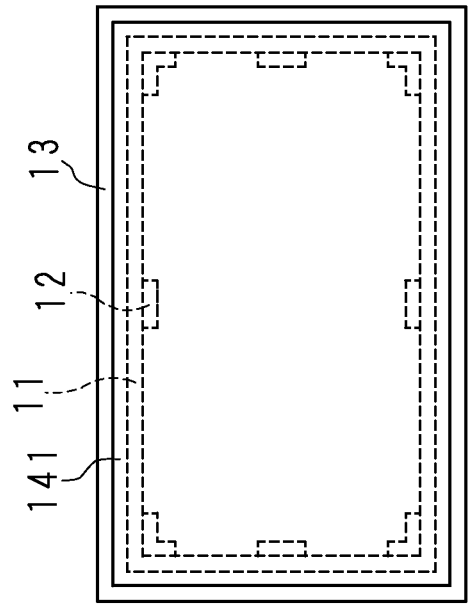
FIGS. 30A to 30D are rear views illustrating an example of an arrangement of the first resin and the second resin according to Embodiment 4.
Figure 30B:
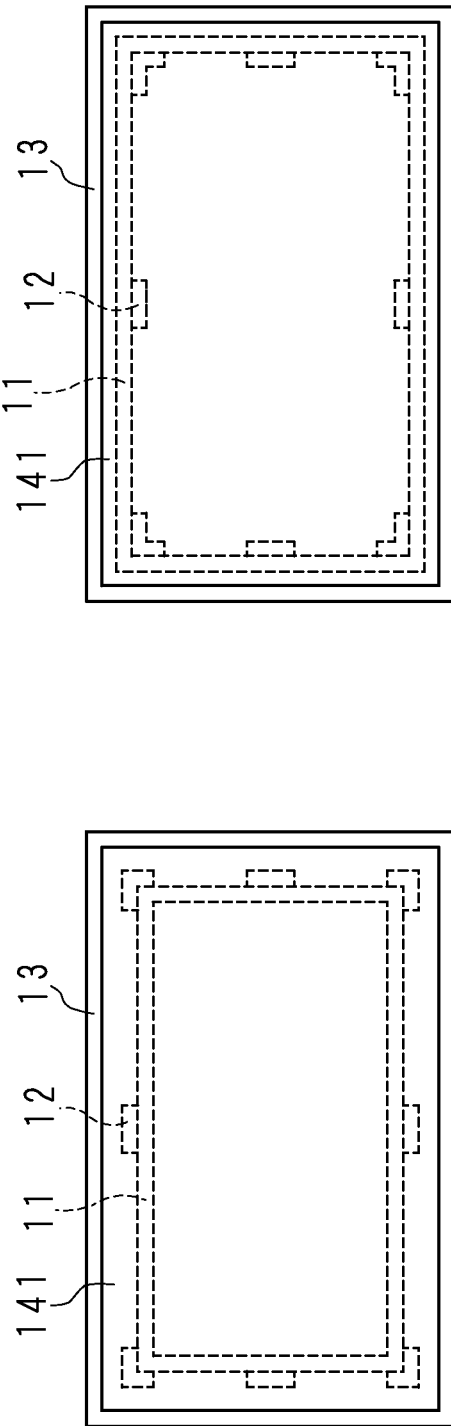

Moreover, unlike FIG. 30A, such a configuration may also be possible that the second resin 12 is provided along the entire perimeter of the peripheral border and the first resin 11 is provided at multiple portions in the form of being in contact with a part of the inner peripheral side surfaces of the second resin 12, as illustrated in FIG. 30B, for example. This configuration produces an effect similar to the example above.

Figure 30C:
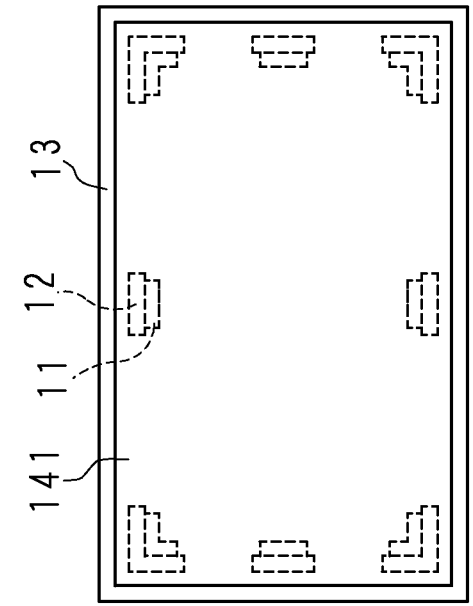
Figure 30D:
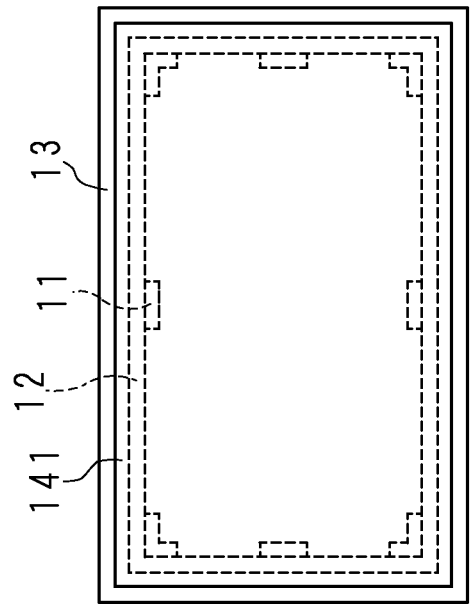

Furthermore, unlike FIG. 30A, the first resin 11 may be located at the outer peripheral side and the second resin 12 may be located at the inner peripheral side, as illustrated in FIG. 30C. Here, the first resin 11 is provided in the shape of a rectangular frame along the entire perimeter of the peripheral border, whereas the second resin 12 is provided at multiple parts in the form of being in contact with parts of the inner peripheral side surfaces of the first resin 11. It is also possible here that the second resin 12 may be provided along the entire perimeter and the first resin 11 may be provided at multiple parts in the form of being in contact with the outer peripheral side surfaces of the second resin 12. Furthermore, as illustrated in FIG. 30D, both the first resin 11 and the second resin 12 may also be provided only at parts of the peripheral border. Here, the first resin 11 is provided at parts of the peripheral border, whereas the second resin 12 is provided at the same parts of the peripheral border in the form of being in contact with the first resin 11.

While the configuration has been described where the first resin 11 is in contact with the second resin 12, another configuration where the first resin 11 and the second resin 12 are separated from each other as in Embodiment 2 may also be employed.

According to Embodiment 4, therefore, the first resin 11 or the second resin 12 may be provided at a part of the peripheral border. This can, for example, reduce the amount of the first resin 11 or the second resin 12 to be applied, and shorten the time for application.

Embodiment 5

In the present embodiment, a configuration where the first resin 11 or the second resin 12 is applied to the casing 143 of the display device 14 will be described.

Figure 31A:
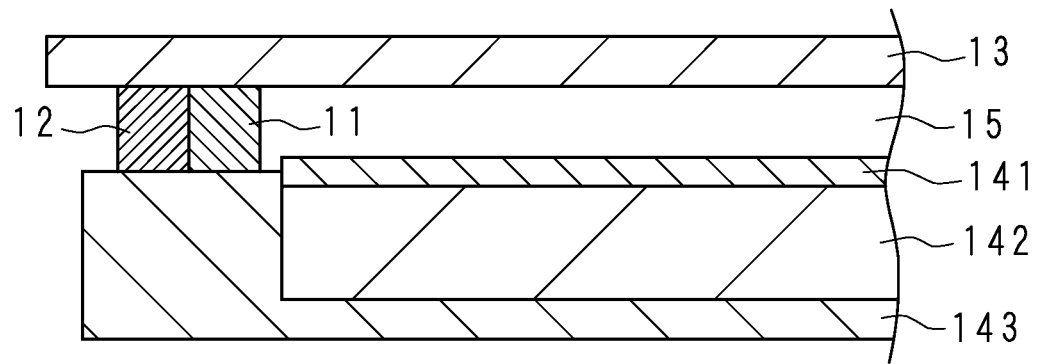
FIGS. 31A and 31B illustrate an example of an air gap bonding structure according to Embodiment 5.
Figure 31B:
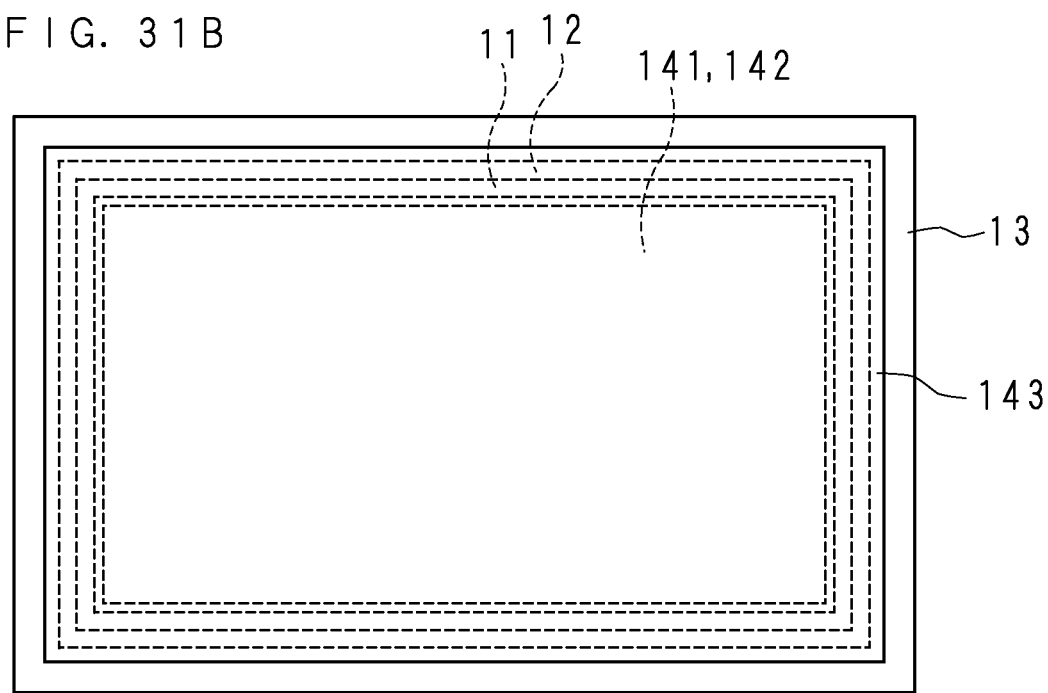

FIGS. 31A and 31B illustrate a configuration example of a display apparatus 1 according to Embodiment 5. FIG. 31A is a partial section view illustrating an example of an air gap bonding structure according to Embodiment 5. FIG. 31B is a rear view illustrating an example of the air gap bonding structure according to Embodiment 5. In FIGS. 31A and 31B, the first resin 11 and the second resin 12 are not in contact with the display panel 141 but are in contact with the casing 143. More specifically, as illustrated in FIG. 31A, the first resin 11 and the second resin 12 are provided on an end face of the side wall of the casing 143 located on the opening face of the casing 143 and opposed to the back surface of the functional substrate 13. For example, the first resin 11 is provided in the shape of a rectangular frame body on the end face, whereas the second resin 12 is provided also on the end face in the shape of a rectangular frame to be in contact with the outer peripheral side surface of the first resin 11. The first resin 11 and the second resin 12 are in contact with the end face of the casing 143, while being in contact with the back surface of the functional substrate 13. In the configuration described above, the amount of application is appropriately adjusted for the first resin 11 and the second resin 12, so that the functional substrate 13 is adhered to the casing 143 while appropriately maintaining the distance between the display device 14 and the functional substrate 13.

Figure 32:
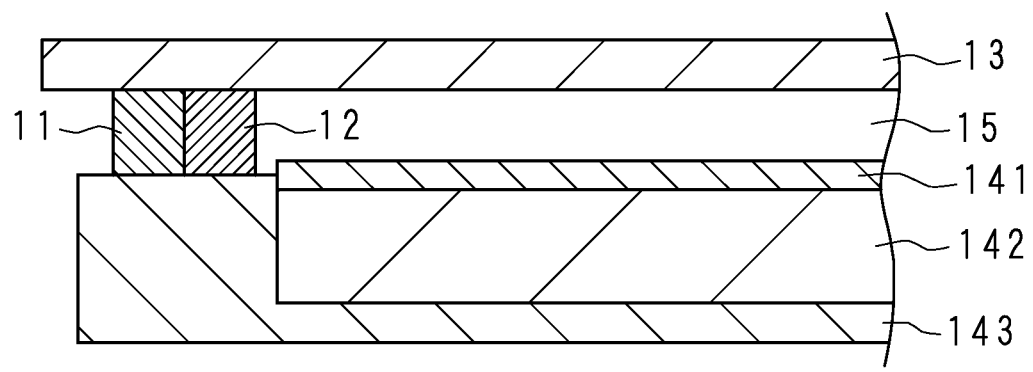
FIG. 32 is a partial section view illustrating another example of the air gap bonding structure according to Embodiment 5.

FIG. 32 illustrates another example of the air gap bonding structure according to Embodiment 5. In FIG. 32, unlike the configuration example illustrated in FIG. 31A, a configuration example where the first resin 11 is located at the outer peripheral side on the end face whereas the second resin 12 is provided at the inner peripheral side on the end face is illustrated. That is, the positional relationship of the first resin 11 and the second resin 12 is reversed from that in the configuration example illustrated in FIG. 31A. Even in the configuration example illustrated in FIG. 32, an effect similar to that illustrated in FIG. 31A is produced.

Moreover, FIGS. 33A to 34B illustrate another example of the air gap bonding structure according to Embodiment 5. While FIGS. 31A, 31B and 32 illustrate the configuration example where the first resin 11 and the second resin 12 are located on the end face of the casing 143, the first resin 11 or the second resin 12 may be provided in the form of bridging the end face and the display panel 141. More specifically, the first resin 11 or the second resin 12 are provided in the form of being in contact with the end face of the casing 143 in the display device 14 and with the display surface of the display panel 141, and also being in contact with the back surface of the functional substrate 13. For example, in the configuration example illustrated in FIG. 33A, the second resin 12 is provided in the form of bridging the end face and the display panel 141. Here, the second resin 12 is in contact with both the display panel 141 and the casing 143. Moreover, the second resin 12 is also in contact with the back surface of the functional substrate 13. It is noted that the first resin 11 is provided on the display surface of the display panel 141 and is in contact with the inner peripheral side surface of the second resin 12.

Figure 33A:
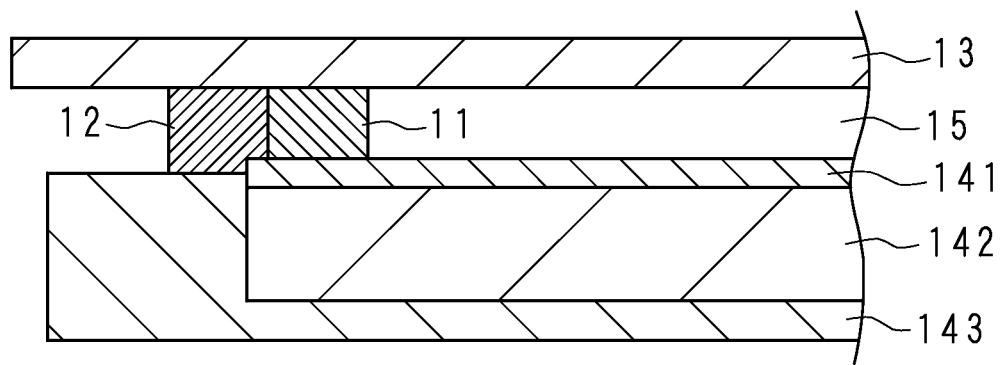
FIGS. 33A and 33B are partial section views illustrating another example of the air gap bonding structure according to Embodiment 5.
Figure 33B:
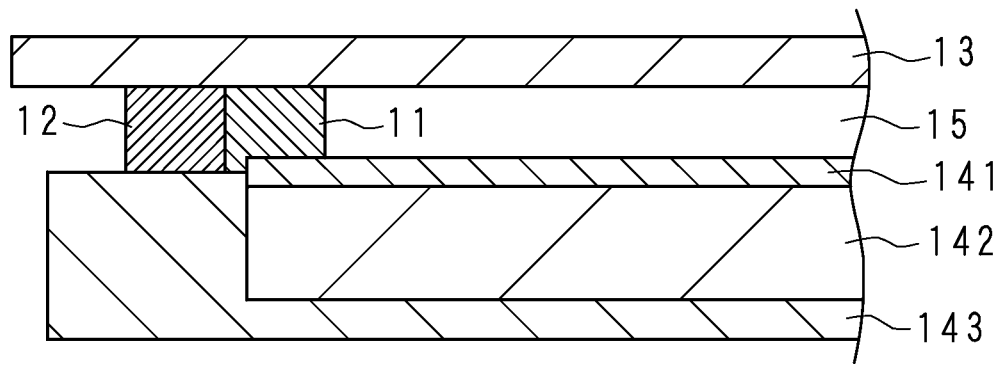
Figure 34A:
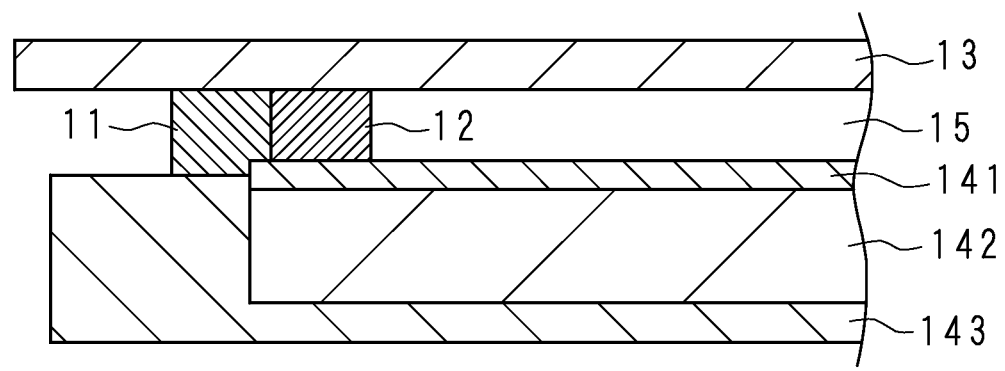
FIGS. 34A and 34B are partial section views illustrating another example of the air gap bonding structure according to Embodiment 5.
Figure 34B:
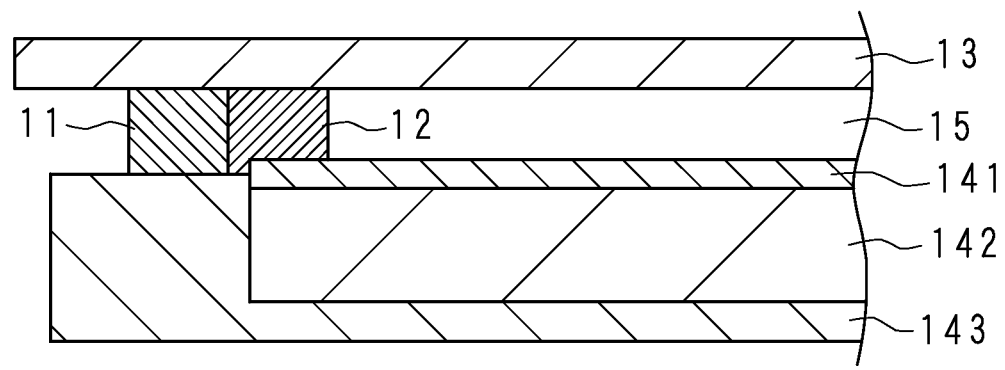

Furthermore, as illustrated in FIG. 33B, the first resin 11 may be provided in the form of bridging the end face and the display panel 141. In the configuration example illustrated in FIG. 33B, the second resin 12 is provided in the form of being in contact with the outer peripheral side surface of the first resin 11. As illustrated in FIG. 34A, the first resin 11 may bridge the end face and the display panel 141, and the second resin 12 may be located at the inner peripheral side of the first resin 11. Moreover, as illustrated in FIG. 34B, the second resin 12 is provided in the form of bridging the end face and the display panel 141, and the first resin 11 may be provided on the end face in the form of being in contact with the outer peripheral side surface of the second resin 12. That is, unlike FIG. 33A, the first resin 11 may be located at the outer peripheral side of the second resin 12.

Figure 35A:
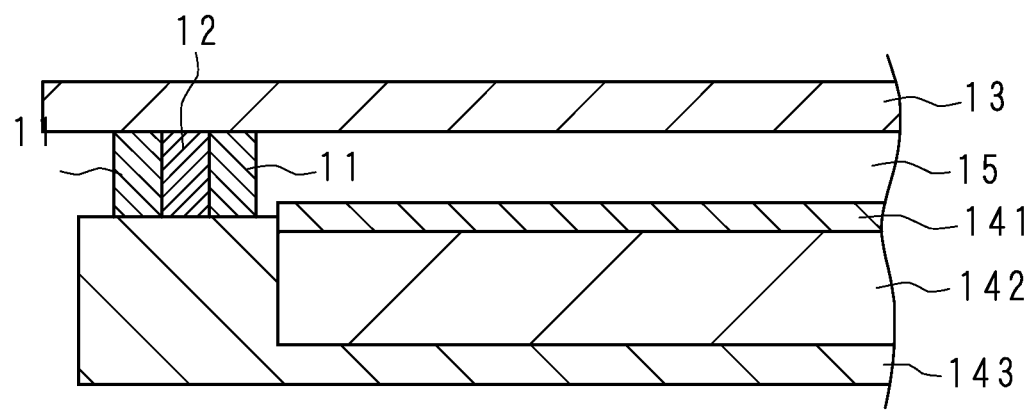
FIGS. 35A and 35B are partial section views illustrating another example of the air gap bonding structure according to Embodiment 5.
Figure 35B:
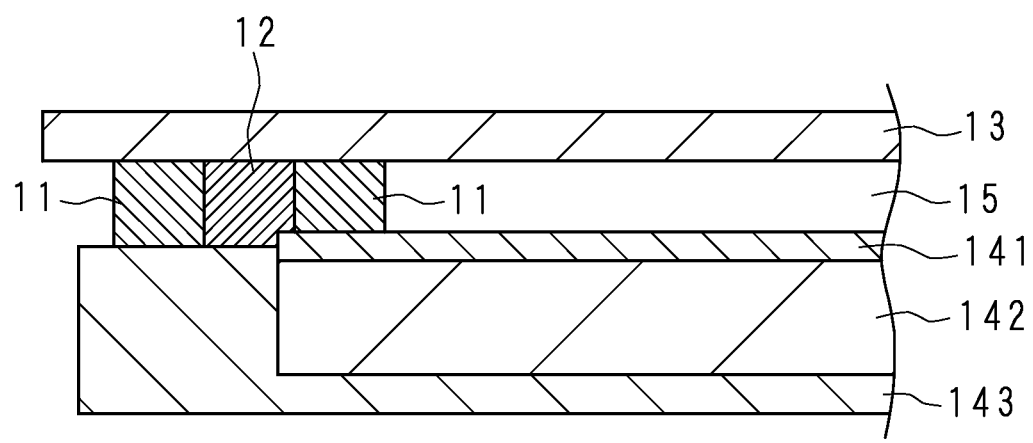

Furthermore, as illustrated in FIG. 35A, the first resin 11 and 11 may be provided on the end face while being separated from each other and the second resin 12 may be provided between the first resin 11 and 11. Moreover, as illustrated in FIG. 35B, in the configuration where the second resin 12 is located between the first resin 11 and 11, the second resin 12 may bridge the end face and the display panel 141. While FIG. 35B illustrates that the second resin 12 bridges the end face and the display panel 141, it is understood that the first resin 11 may alternatively bridge the end face and the display panel 141. While FIGS. 35A and 35B illustrate the configuration where the second resin 12 is located between the first resin 11 and 11, it is understood that the second resin 12 and 12 may also be provided on both sides of the first resin 11.

Figure 36A:
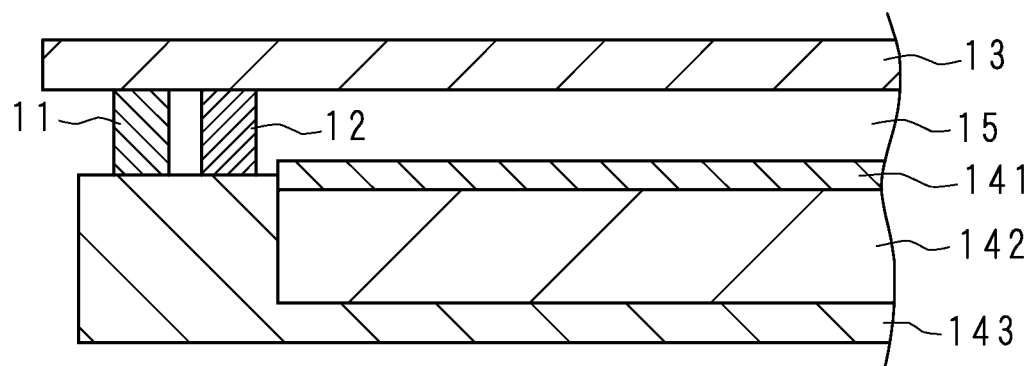
FIGS. 36A and 36B are partial section views illustrating another example of the air gap bonding structure according to Embodiment 5.
Figure 36B:
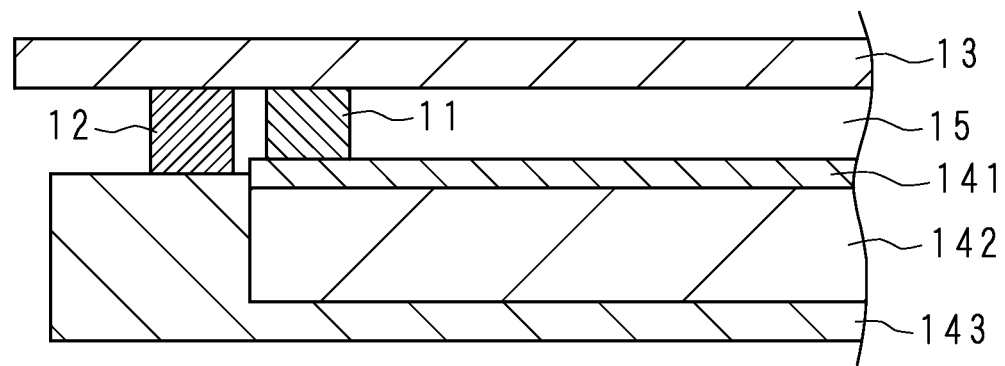

Furthermore, as illustrated in FIGS. 36A and 36B, the first resin 11 and the second resin 12 may be separated from each other. For example, as illustrated in FIG. 36A, the first resin 11 and the second resin 12 may be separated from each other on the end face. Furthermore, as illustrated in FIG. 36B, the second resin 12 may be provided on the end face while the first resin 11 may be provided on the display surface of the display panel 141. In the configuration example illustrated in FIGS. 36A and 36B, the positional relationship of the first resin 11 and the second resin 12 may be reversed. Furthermore, in the configuration example illustrated in FIGS. 36A and 36B, the first resin 11 or the second resin 12 may be provided in the form of bridging the end face and the display panel 141.

Figure 37A:
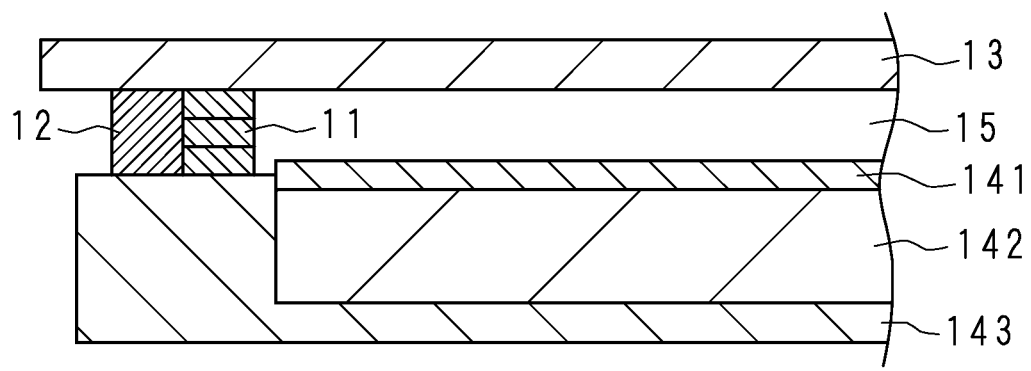
FIGS. 37A and 37B are partial section views illustrating another example of the air gap bonding structure according to Embodiment 5.
Figure 37B:
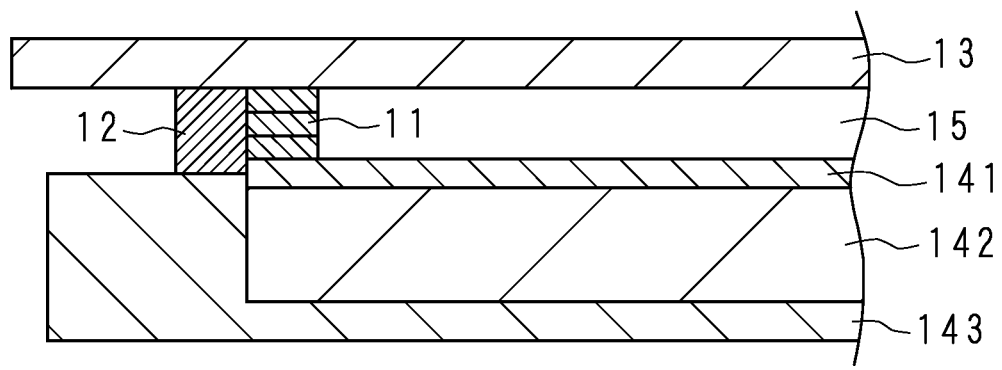

As illustrated in FIGS. 37A and 37B, the first resin 11 or the second resin 12 may have a multi-layered structure. FIGS. 37A and 37B illustrate a configuration example where the first resin 11 has a multi-layered structure. FIG. 37A illustrates a configuration example where the first resin 11 and the second resin 12 are in contact with each other and are located on the end face. FIG. 37B illustrates a configuration example where the first resin 11 is provided on the display panel 141 and the second resin 12 is provided on the end face while being in contact with each other. It is understood that the second resin 12 may have a multi-layered structure, and both the first resin 11 and the second resin 12 may have multi-layered structures. Moreover, the positional relationship of the first resin 11 and the second resin 12 may be reversed, one of the resin may bridge the end face and the display panel 141, or one of the resin may be provided on both sides of the other resin.

According to Embodiment 5, even with the configuration where the first resin 11 or the second resin 12 is provided at the casing 143 of the display device 14, an effect similar to those in Embodiments 1 to 4 may be produced.

Embodiment 6

The present embodiment describes a configuration where the display device 14 includes a bezel 144 for protecting the display surface of the display panel 141.

Figure 38A:
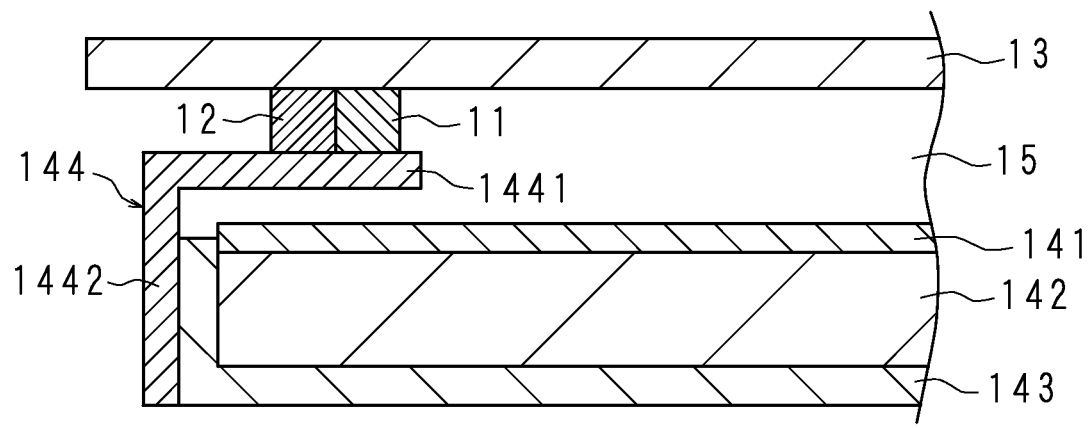
FIGS. 38A and 38B illustrate an example of an air gap bonding structure according to Embodiment 6.
Figure 38B:
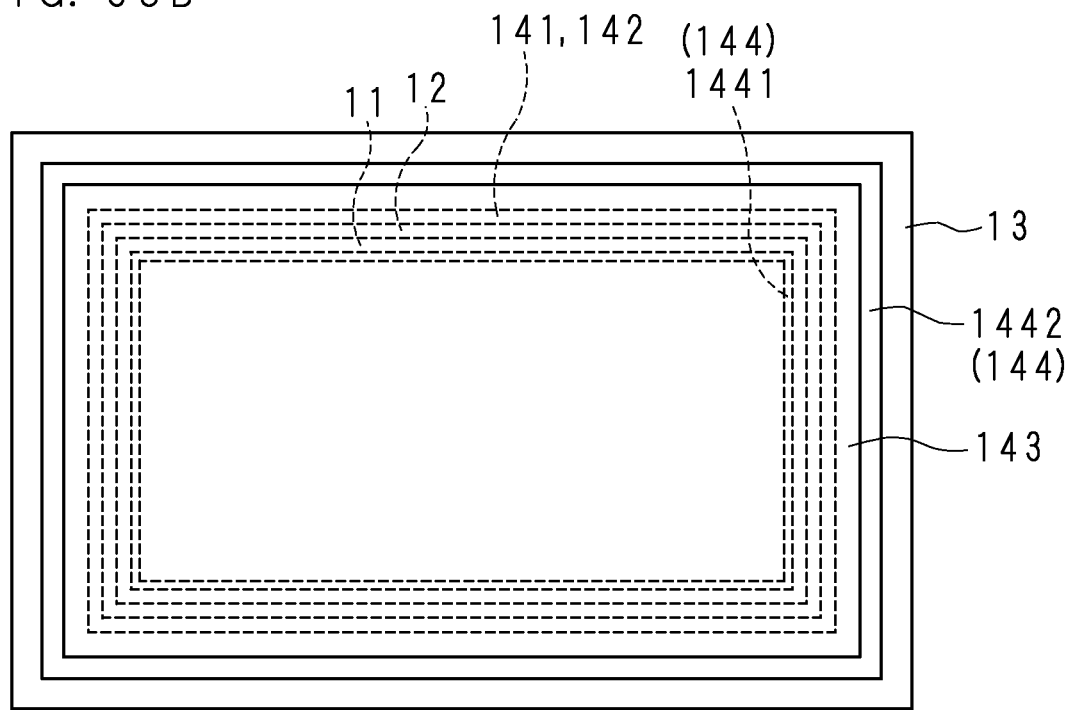

FIGS. 38A and 38B illustrate a configuration example of a display apparatus 1 according to Embodiment 6. FIG. 38A is a partial section view illustrating an example of an air gap bonding structure according to Embodiment 6. FIG. 38B is a rear view illustrating an example of the air gap bonding structure according to Embodiment 6. The display device 14 according to the present embodiment includes a bezel 144. The bezel 144 is a frame for holding the display panel 141 and, for example, is a metal plate made of stainless steel. The bezel 144 has a front part 1441 and a side part 1442. The front part 1441 has the shape of a rectangular frame, and covers the peripheral border of the display panel 141 in the state where the display area of the display panel 141 is exposed through the opening of the rectangular frame. The side part 1442 has the shape of a rectangular tube, and protrudes from the outer peripheral border of the front part 1441 in the back surface direction. The side part 1442 covers the display panel 141, the backlight 142 and the casing 143 from the outer peripheral side.

As illustrated in FIG. 38A, the first resin 11 and the second resin 12 are provided on the front part 1441 of the bezel 144. More specifically, the first resin 11 having the shape of a rectangular frame is provided at the front face of the front part 1441. The second resin 12 is provided also at the front face of the front part 1441 similarly to the first resin 11, in the form of being in contact with the outer peripheral side surface of the first resin 11. The first resin 11 and the second resin 12 are cured in the state of being in contact with the bezel 144 and the functional substrate 13. Accordingly, the first resin 11 maintains the distance between the functional substrate 13 and the bezel 144 concerning the display device 14, while the second resin 12 adheres the functional substrate 13 to the bezel 144. As can be seen from the above, even with the configuration where the display device 14 has a protection frame such as the bezel 144, an effect similar to those in Embodiments 1 to 5 may be produced.

Figure 39A:
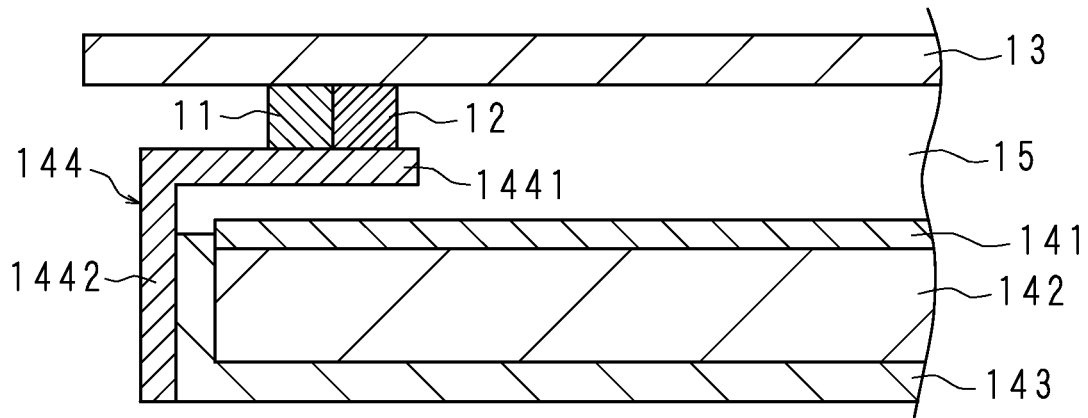
FIGS. 39A to 39C are partial section views illustrating another example of the air gap bonding structure according to Embodiment 6.
Figure 39B:
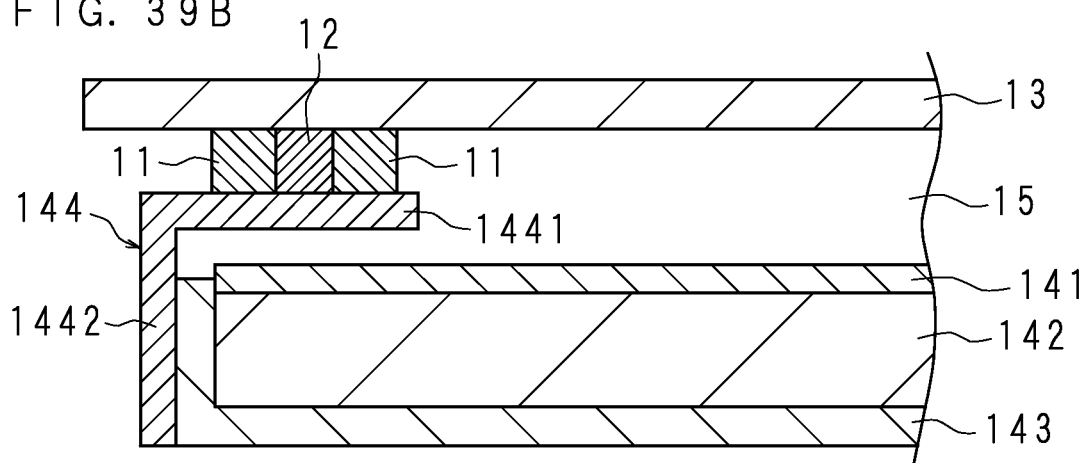
Figure 39C:
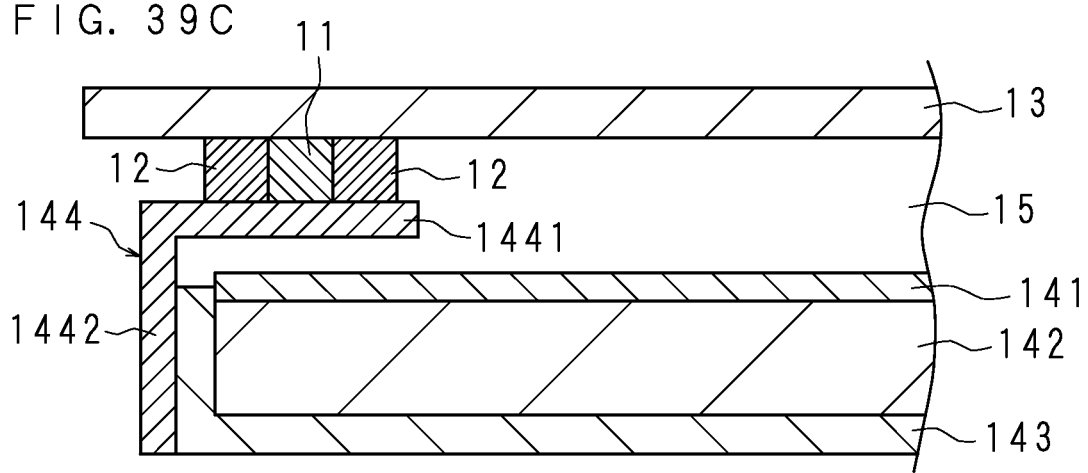

FIGS. 39A to 43B illustrate another example of the air gap bonding structure according to Embodiment 6. As illustrated in FIG. 39A, the first resin 11 may be located at the outer peripheral side on the front part 1441 and the second resin 12 may be located at the inner peripheral side on the front part 1441 while being in contact with each other. Moreover, as illustrated in FIG. 39B, the first resin 11 and 11 may be located on both sides of the second resin 12. Furthermore, as illustrated in FIG. 39C which has reverse positioning from FIG. 39B, the second resin 12 and 12 may be located on both sides of the first resin 11.

Figure 40A:
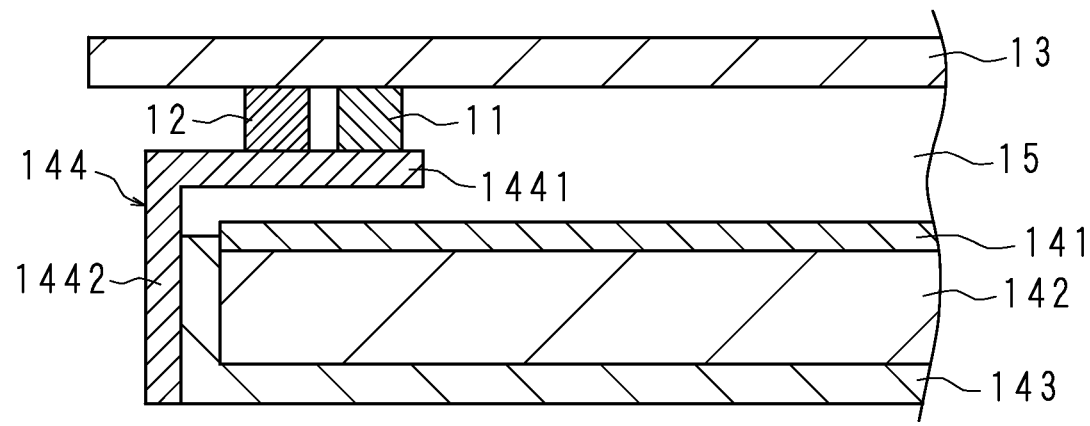
FIGS. 40A and 40B are partial section views illustrating another example of the air gap bonding structure according to Embodiment 6.
Figure 40B:
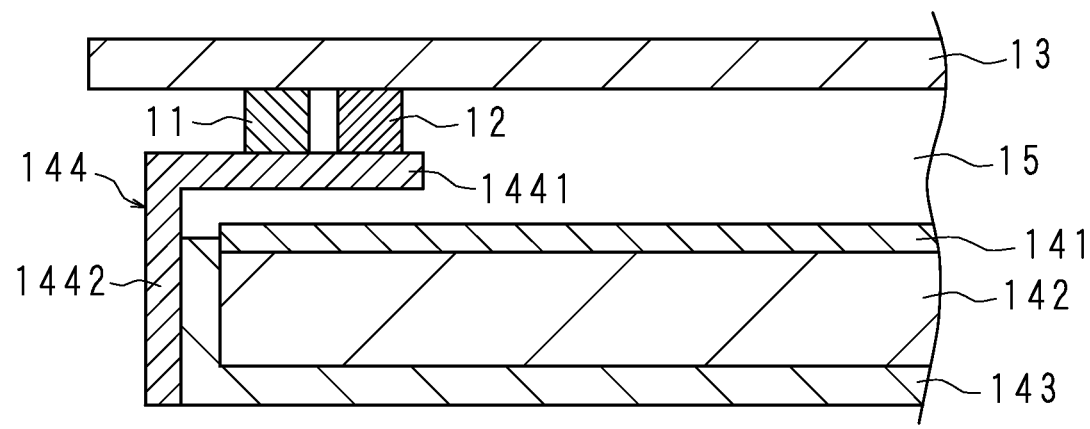
Figure 41A:
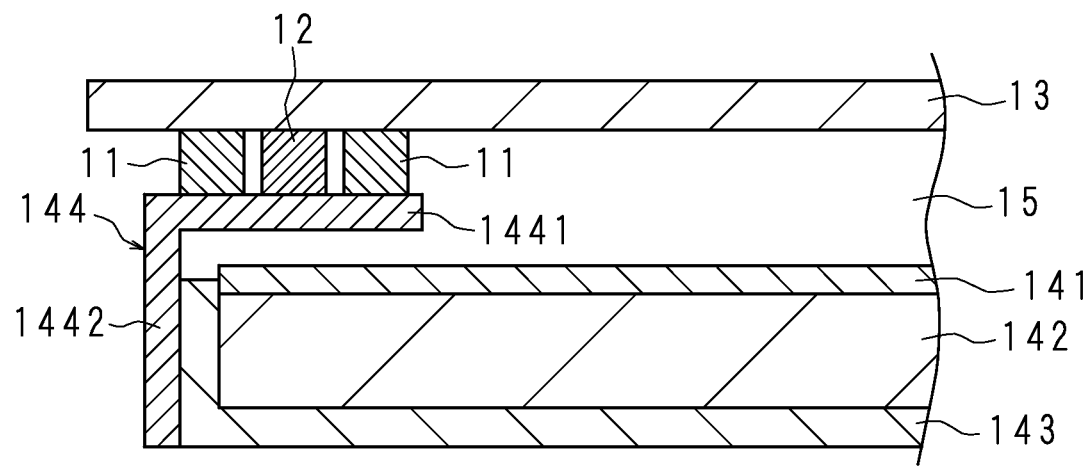
FIGS. 41A and 41B are partial section views illustrating another example of the air gap bonding structure according to Embodiment 6.
Figure 41B:
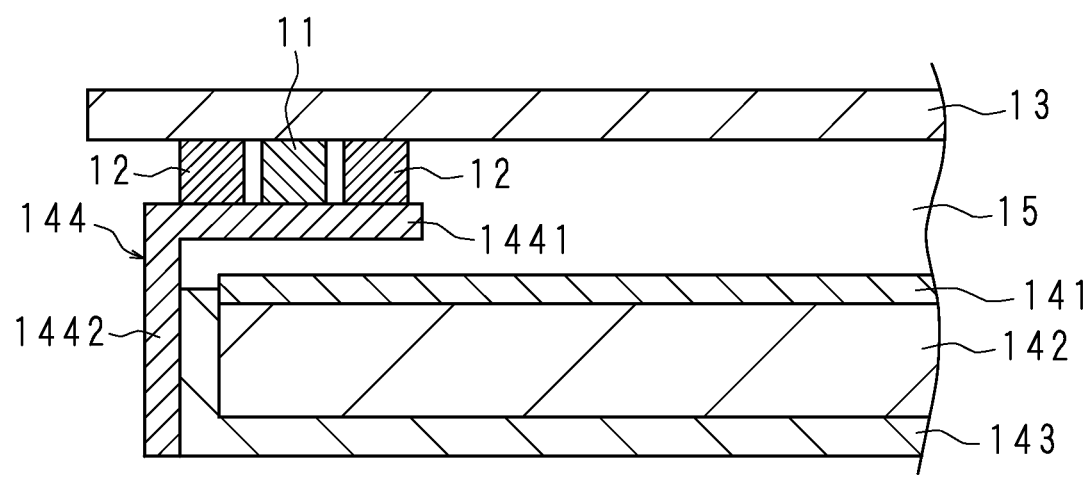

In addition, as illustrated in FIGS. 40A to 41B, the first resin 11 and the second resin 12 may be provided on the front part 1441 of the bezel 144 while being separated from each other. More specifically, as illustrated in FIG. 40A, the first resin 11 and the second resin 12 may be provided on the front part 1441 so as to be located at the inner peripheral side and the outer peripheral side, respectively. Moreover, as illustrated in FIG. 40B, the first resin 11 and the second resin 12 may be provided on the front part 1441 so as to be located at the outer peripheral side and the inner peripheral side, respectively. Furthermore, as illustrated in FIG. 41A, the first resin 11, the second resin 12 and the first resin 11 may be provided on the front part 1441 in the described order from the outer peripheral side to the inner peripheral side while being separated from one another. In addition, as illustrated in FIG. 41B, the second resin 12, the first resin 11 and the second resin 12 may be provided on the front part 1441 in the described order from the outer peripheral side to the inner peripheral side while being separated from one another. Even with the configuration described above, an effect similar to that of the configuration illustrated in FIGS. 38A to 39C is produced.

Figure 42A:
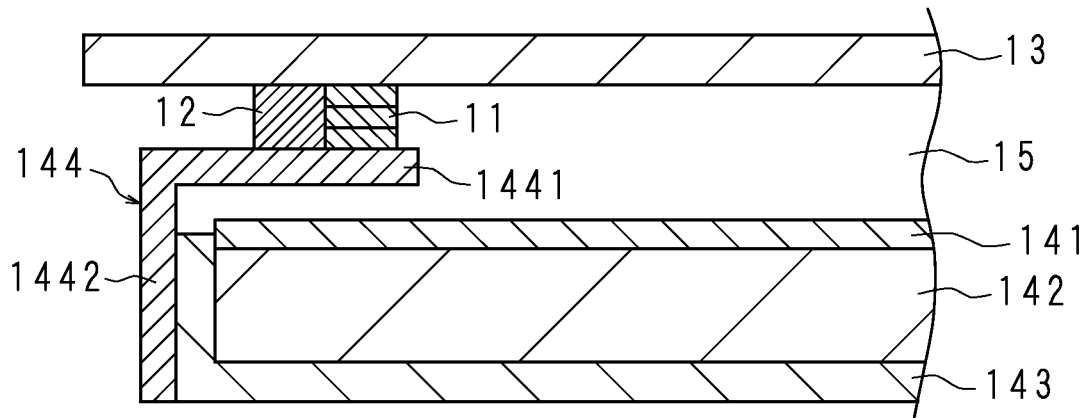
FIGS. 42A to 42C are partial section views illustrating another example of the air gap bonding structure according to Embodiment 6.
Figure 42B:
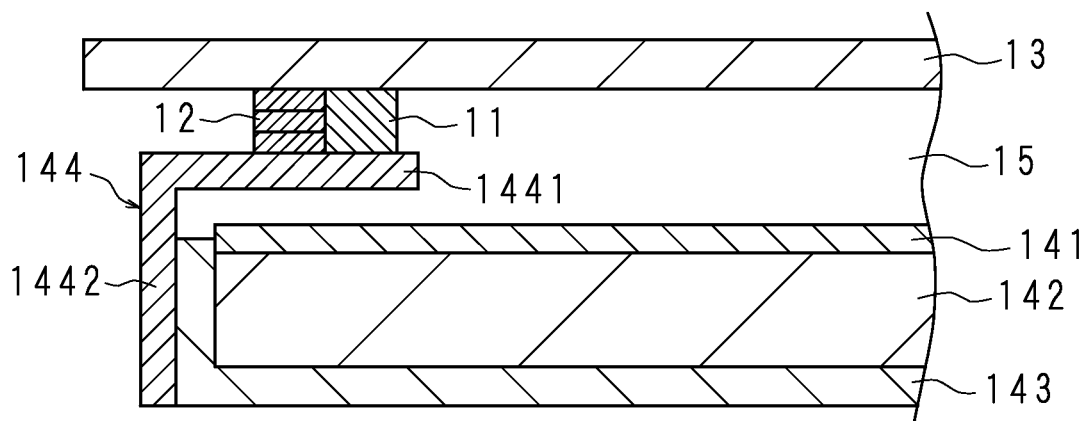
Figure 42C:
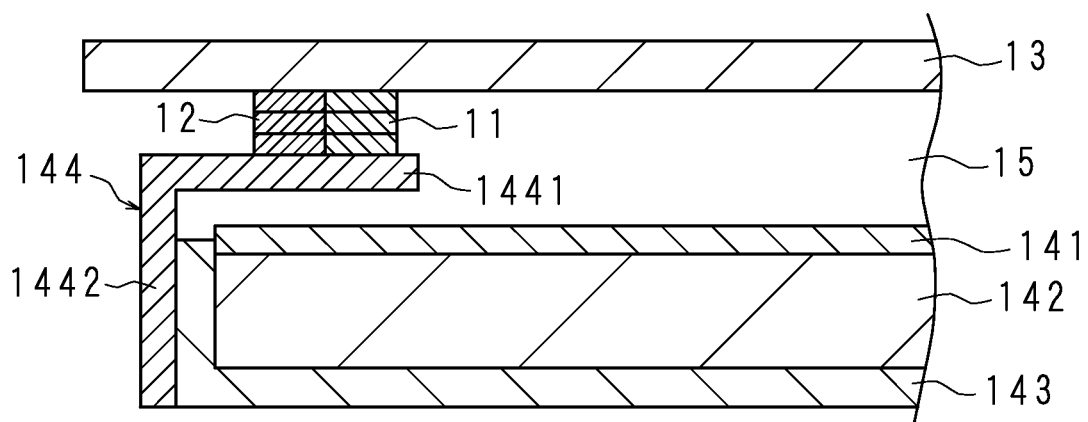

Moreover, as illustrated in FIGS. 42A to 43B, the first resin 11 or the second resin 12 may have a multi-layered structure. For example, as illustrated in FIG. 42A, the first resin 11 may have a multi-layered structure and be located on the front part 1441 of the bezel 144, whereas the second resin 12 may be provided in the form of being in contact with the outer peripheral side surface of the first resin 11. Furthermore, as illustrated in FIG. 42B, the second resin 12 may have a multi-layered structure and be located on the front part 1441, whereas the first resin 11 may be provided in the form of being in contact with the inner peripheral side surface of the second resin 12. In addition, as illustrated in FIG. 42C, both the first resin 11 and the second resin 12 may also have multi-layered structures and be located on the front part 1441 in the form of being in contact with each other. Though FIG. 42C illustrates that the first resin 11 is located on the inner peripheral side whereas the second resin 12 is located on the outer peripheral side, it is understood that the positional relationship of the first resin 11 and the second resin 12 may be reversed.

Figure 43A:
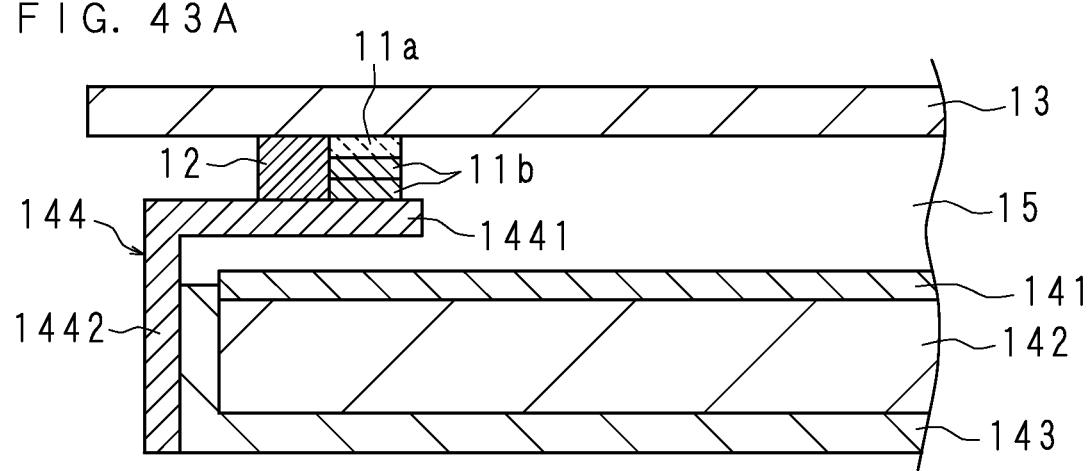
FIGS. 43A and 43B are partial section views illustrating another example of the air gap bonding structure according to Embodiment 6.
Figure 43B:
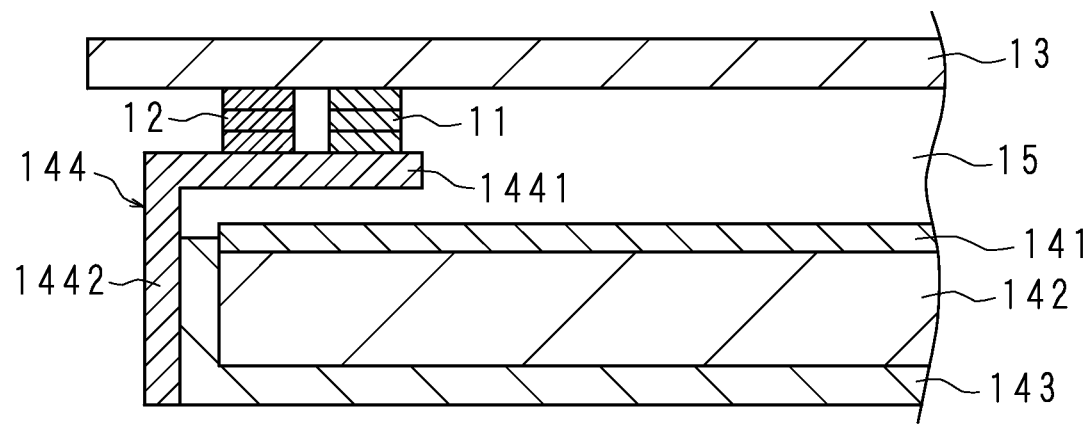

Moreover, as illustrated in FIG. 43A, the first resin 11a concerning a part of the layers may be a resin member different from the first resin 11b concerning the other layers in the configuration illustrated in FIG. 42A. In addition, as illustrated in FIG. 43B, both the first resin 11 and the second resin 12 may have multi-layered structures and be separated from each other. Though FIG. 43B illustrates that both the first resin 11 and the second resin 12 may have multi-layered structures, it is understood that only one of them may have a multi-layered structure. Though FIG. 43B illustrates that the first resin 11 is located on the inner peripheral side whereas the second resin 12 is located on the outer peripheral side, it is understood that the positional relationship of the first resin 11 and the second resin 12 may be reversed.

As can be seen from the above, according to Embodiment 6, even with the configuration where the display device 14 has the bezel 144, an effect similar to those in Embodiments 1 to 5 may be produced.

Embodiment 7

Figure 44A:
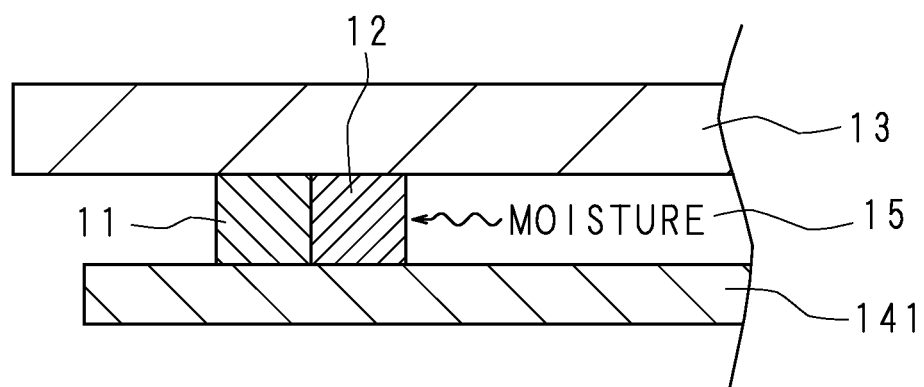
FIGS. 44A and 44B are partial section views illustrating an example of an air gap bonding structure according to Embodiment 7.
Figure 44B:
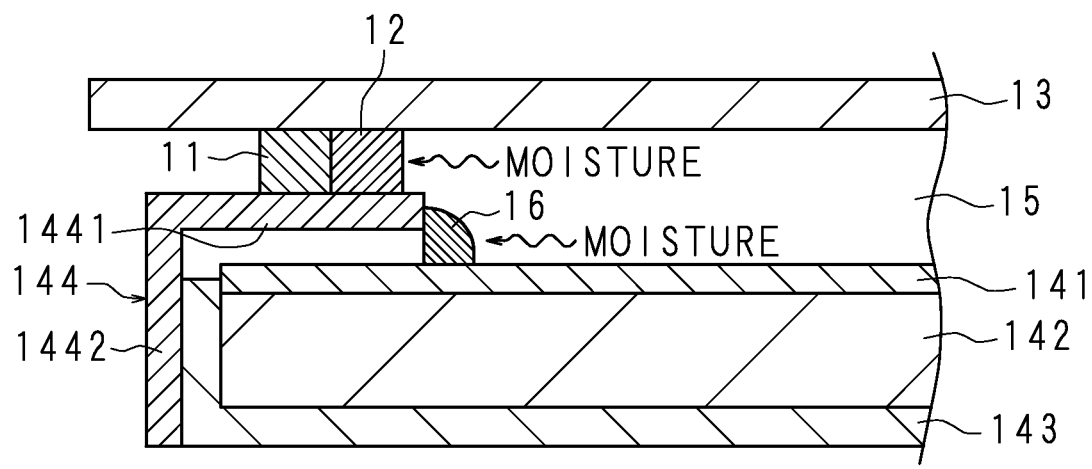

According to the present embodiment, a form of suppressing the occurrence of dew condensation in an air space 15 will be described. FIGS. 44A and 44B illustrate views for explaining how the dew condensation is suppressed. FIG. 44A illustrates a configuration where the first resin 11 and the second resin 12 are provided between the functional substrate 13 and the display panel 141, and the first resin 11 located on the outer peripheral side and the second resin 12 located on the inner peripheral side are in contact with each other, similar to the configuration illustrated in FIG. 16A. In FIG. 44A, the first resin 11 or the second resin 12 is provided on the peripheral border of the display surface of the display panel 141 along the entire perimeter. That is, the first resin 11 and the second resin 12 have an arrangement of any one of those illustrated in FIG. 7B and FIGS. 30A to 30C, excluding that in FIG. 30D from the arrangements illustrated in FIG. 7B and FIGS. 30A to 30D. As the first resin 11 or the second resin 12 is provided along the entire perimeter of the peripheral border of the display panel 141, the first resin 11 or the second resin 12 fills a gap between the functional substrate 13 and the display panel 141 along the entire perimeter. The air space 15 is therefore tightly sealed. In the configuration illustrated in FIG. 44A, the first resin 11 may preferably be made of material having barrier properties to moisture so as to shield against the moisture intruding from the outside of the display apparatus 1 into the air space 15. Such material includes, for example, epoxy-based resin.

FIG. 44B illustrates a configuration where the display device 14 has a bezel 144, and where the first resin 11 and the second resin 12 are provided at the front part 1441 of the bezel 144 so as to be located at the outer peripheral side and the inner peripheral side, respectively. Also in the configuration example illustrated in FIG. 44B, the first resin 11 or the second resin 12 is provided along the entire perimeter on the front part 1441 of the bezel 144, as in the case of FIG. 44A.

The air gap bonding structure in FIG. 44B is substantially similar to the air gap bonding structure illustrated in FIG. 39A. The air gap bonding structure in FIG. 44B however has the third resin 16, unlike the case in FIG. 39A. The third resin 16 is resin material for filling the gap generated between the display surface of the display panel 141 and the front part 1441 of the bezel 144 and for tightly sealing the air space 15. For example, the third resin 16 is so provided as to shield the boundary between the gap and the air space 15 along the entire perimeter from the inner edge of the front part 1441 on the opening side to the display surface of the display panel 141. More specifically, the third resin 16 is provided along the entire perimeter of the inner edge of the rectangular-frame-shaped front part 1441 on the opening side. The third resin 16 is so provided along the entire perimeter as to extend from the inner edge of the front part 1441 to the display surface of the display panel 141. Thus, the third resin 16 shields the entire perimeter of the boundary between the air space 15 and the gap between the display panel 141 and the front part 1441, to fill the gap. Moreover, as described above, the first resin 11 or the second resin 12 is provided along the entire perimeter on the front part 1441, to fill the gap between the functional substrate 13 and the bezel 144. Accordingly, the air space 15 may be tightly sealed by combining the air gap bonding structure illustrated in FIG. 39A with the third resin 16. Though the composition of the third resin 16 is not specifically limited, the third resin 16 may preferably be moisture-curable resin for preventing dew condensation which will be described later.

Suppression of the occurrence of dew condensation will now be described. Generally, in the display apparatus 1 having the functional substrate 13, the air space 15 between the functional substrate 13 and the display panel 141 is tightly sealed. In the case where the display apparatus 1 is switched from a high temperature state to a low temperature state, the moisture contained in the air space 15 is condensed due to temperature drop, generating dew condensation. This causes a problem such as lowered visibility of the display panel 141. According to the present embodiment, therefore, moisture-curable resin is employed as the second resin 12, to prevent dew condensation from occurring, as described below.

More specifically, the first resin 11 or the second resin 12 is provided on the peripheral borders of the functional substrate 13 and the display device 14 along the entire perimeter, to tightly seal the air space 15. As the second resin 12 is moisture-curable resin, if the second resin 12 is applied to bond the display device 14 to the functional substrate 13 and is left to be cured, the second resin 12 absorbs the moisture contained in the air space 15 and is cured. Accordingly, the amount of moisture contained in the air space 15 is reduced after curing of the second resin 12 compared to before curing. This suppresses the occurrence of dew condensation in the air space 15.

Furthermore, in the case of a tightly-sealed structure provided with the third resin 16, the third resin 16 may be moisture-curable resin. Accordingly, as illustrated in FIG. 44B, the third resin 16 absorbs the moisture contained in the air space 15, further suppressing the occurrence of dew condensation.

Though FIGS. 44A and 44B illustrate the configuration where the first resin 11 is located at the outer side on the peripheral borders of the display device 14 and the functional substrate 13 whereas the second resin 12 is located at the inner side thereof, the present embodiment is not limited thereto. That is, the first resin 11 may be located at the inner side on the peripheral border and the second resin 12 may be located at the outer side on the peripheral border. Here, it is preferable for the second resin 12 to have permeability to moisture so as to absorb the moisture in the air space 15 through the first resin 11. Such material includes, for example, silicon-based resin. This configuration produces an effect similar to the examples above.

According to Embodiment 7, therefore, the second resin 12 may be moisture-curable resin, so that the occurrence of dew condensation in the air space 15 between the display device 14 and the functional substrate 13 may be suppressed.

Embodiment 8

According to the present embodiment, a form where the pneumatic pressure of the air space 15 is higher than the atmospheric pressure will be described.

Figure 45A:
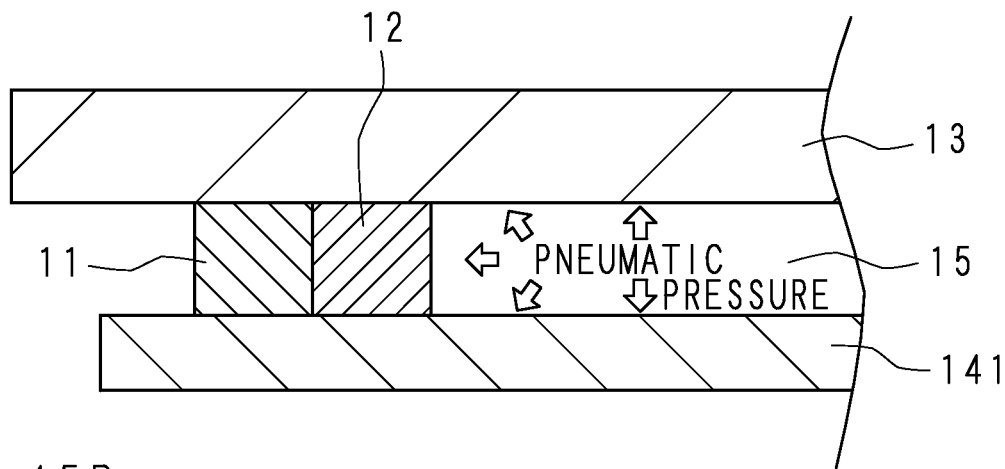
FIGS. 45A and 45B are partial section views illustrating an example of an air gap bonding structure according to Embodiment 8.
Figure 45B:
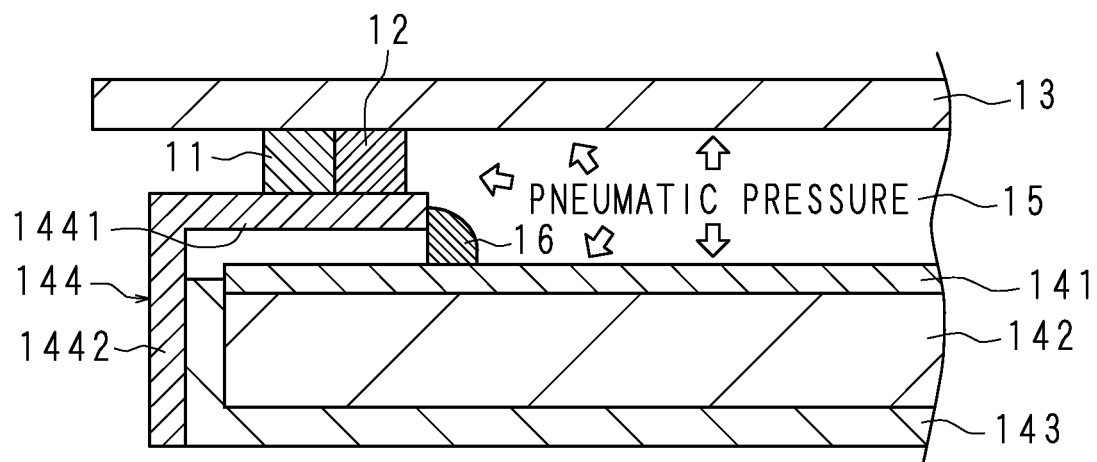

FIGS. 45A and 45B illustrate an example of an air gap bonding structure according to Embodiment 8. FIG. 45A is a partial section view illustrating an example of the air gap bonding structure according to Embodiment 8. FIG. 45B is a partial section view illustrating another example of the air gap bonding structure according to Embodiment 8. The configuration of the display apparatus 1 illustrated in FIGS. 45A and 45B is similar to the configuration of the display apparatus 1 illustrated in FIGS. 44A and 44B. The air space 15 between the display device 14 and the functional substrate 13 is therefore tightly sealed. The air space 15 has, however, pressure higher than atmospheric pressure according to the present embodiment.

More specifically, in the case where the display device 14 and the functional substrate 13 are bonded together (see FIG. 8C), a bonding work is carried out under the pressurized environment higher than atmospheric pressure. Accordingly, the air with pressure higher than the atmospheric pressure is enclosed in the air space 15. Since the air space 15 is tightly sealed, the air in the air space 15 expands and generates pressure toward the outside the display apparatus 1. Thus, the functional substrate 13 will have a state of being pressurized from the back side to the front side after bonding. In the case where the functional substrate 13 is pressed from the front side in such a state, the pressure from the air space 15 works in the opposite direction to the pressing force. That is, a damper effect is produced. Thus, the functional substrate 13 would not easily be deformed even when pressed, thereby not easily making contact with the display surface of the display panel 141. That is, the occurrence of display unevenness may further be suppressed.

FIG. 46 illustrates a comparative example in which the pressing force causing display unevenness is compared between the display apparatus 1 with the pressure in the air space 15 higher than the atmospheric pressure and the display apparatus 1 with the pressure in the air space 15 equal to the atmospheric pressure. More specifically, in FIG. 46, the case where the air space 15 is in a sealed state and the air space 15 has pressure higher than the atmospheric pressure is compared with the case where the air space 15 is in a non-sealed state and the air space 15 has pressure equal to the atmospheric pressure. It is noted that FIG. 46 illustrates a comparative example where comparison is made for the liquid crystal displays (display devices 14) of different sizes. As illustrated in FIG. 46, the display apparatus 1 with the pressure in the air space 15 higher than the atmospheric pressure has a larger pressing force causing display unevenness compared to the display apparatus 1 with the pressure in the air space 15 equal to the atmospheric pressure. That is, the display apparatus 1 with the pressure of the air space 15 higher than the atmospheric pressure may prevent the functional substrate 13 from warping due to the damper effect.

According to Embodiment 8, therefore, the pressure in the air space 15 is higher than the atmospheric pressure so that the functional substrate 13 will not easily warp, further suppressing the occurrence of display unevenness. Since the functional substrate 13 does not easily warp, it is possible to narrow the distance between the functional substrate 13 and the display panel 141. This contributes to reduction in the thickness of the display apparatus 1.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

What is claimed is:

1. A display apparatus; comprising:
    a display device;
    a functional substrate opposed to and bonded to the display device through a first air space; and
    at peripheral borders of opposed surfaces of the display device and the functional substrate, and being at a predetermined distance from a peripheral edge of the opposed surfaces, leaving a second air space upon curing, a first resin maintaining a distance between the display device and the functional substrate, and a second resin adhering the display device and the functional substrate to each other, wherein
    the first resin and the second resin are in contact with each other,
    the second resin is located outside of the first resin,
    contact points between an outer peripheral side surface of the second resin and each of the display device and the functional substrate are located inside the peripheral edge, and
    the predetermined distance is at least as long as the width of the second resin.

2. The display apparatus according to claim 1, wherein the first resin or the second resin is provided along an entire perimeter of the peripheral borders, and the air space is tightly sealed.

3. The display apparatus according to claim 2, wherein the second resin is a moisture-curable resin.

4. The display apparatus according to claim 2, wherein the first air space has a pressure higher than atmospheric pressure.

5. The display apparatus according claim 1, wherein the first resin has a Shore 00 hardness of 10 to 50.

6. The display apparatus according to claim 1, wherein the first resin or the second resin is provided at a part of the peripheral border.

* * * * *